United States Patent
Li et al.

(10) Patent No.: US 12,392,983 B1
(45) Date of Patent: Aug. 19, 2025

(54) AUTO FOCUS IN CONSUMER DEVICES

(71) Applicant: Amazon Technologies, Inc., Seattle, WA (US)

(72) Inventors: Wenting Li, Shenzhen (CN); Bambie Maybuena Olorvida, Cabuyao Laguna (PH); Thanh Minh Ngo, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 872 days.

(21) Appl. No.: 17/481,164

(22) Filed: Sep. 21, 2021

Related U.S. Application Data

(60) Provisional application No. 63/224,004, filed on Jul. 21, 2021.

(51) Int. Cl.
G02B 7/02 (2021.01)
G02B 7/38 (2021.01)
H04N 23/67 (2023.01)

(52) U.S. Cl.
CPC ............... *G02B 7/023* (2013.01); *G02B 7/38* (2013.01); *H04N 23/67* (2023.01)

(58) Field of Classification Search
CPC .......... G02B 7/023; G02B 7/38; H04N 23/67
USPC ....................................................... 359/823
See application file for complete search history.

(56) References Cited

U.S. PATENT DOCUMENTS

| | | | |
|---|---|---|---|
| 2007/0086771 A1* | 4/2007 | Lee | G02B 7/021 396/144 |
| 2008/0095523 A1* | 4/2008 | Schilling-Benz | H04N 23/673 396/111 |
| 2010/0079602 A1* | 4/2010 | Napper | H04N 17/002 348/208.1 |
| 2010/0125816 A1* | 5/2010 | Bezos | G06F 3/017 715/863 |
| 2013/0016275 A1* | 1/2013 | Hokoi | H04N 25/611 348/E7.001 |
| 2013/0182152 A1* | 7/2013 | Li | H04N 23/673 348/241 |
| 2015/0182937 A1* | 7/2015 | Futakuchi | C25B 1/55 422/82.02 |
| 2015/0195446 A1* | 7/2015 | Saito | H04N 23/672 348/353 |
| 2015/0215615 A1* | 7/2015 | Chou | G06T 7/80 348/187 |
| 2017/0070677 A1* | 3/2017 | Nilsson | H04N 23/689 |
| 2018/0084189 A1* | 3/2018 | Shida | H04N 23/76 |
| 2018/0088297 A1* | 3/2018 | Komiyama | G02B 7/021 |
| 2018/0109718 A1* | 4/2018 | Okubo | H04N 25/134 |
| 2019/0129286 A1* | 5/2019 | Lin | G02B 27/0955 |
| 2019/0373162 A1* | 12/2019 | Celik | H04N 23/67 |
| 2021/0232021 A1* | 7/2021 | Park | G03B 30/00 |
| 2022/0159152 A1* | 5/2022 | Zhou | H04N 17/002 |

* cited by examiner

*Primary Examiner* — Sharrief I Broome
(74) *Attorney, Agent, or Firm* — Kilpatrick Townsend & Stockton LLP

(57) ABSTRACT

A method includes receiving a curve fit to through focus data for a lens. The method involves capturing an image with the lens and determining, based on the curve fit, a measurement associated with the image and an associated lens position of the lens. The method additionally includes adjusting the lens position based on the measurement.

20 Claims, 14 Drawing Sheets

AUTO FOCUS IN CONSUMER DEVICES

CROSS-REFERENCE TO RELATED APPLICATIONS

This application claims priority to and the benefit of U.S. Provisional Patent Application No. 63/224,004, filed Jul. 21, 2021, and entitled "AUTO FOCUS BASED ON CURVE FITTING," the contents of which is herein incorporated by reference in its entirety for all purposes.

BACKGROUND

Optical systems have limited depth of field, the distance at which image data produces sharp images of objects. The focal length of a lens may be adjusted, thereby changing the focus for the lens, but conventional methods for adjusting the focal length involve mechanical components that require time to adjust the focal length as needed. Thus, there exists a need in the art for improved methods and systems related to focusing lenses utilized in optical systems.

BRIEF DESCRIPTION OF THE DRAWINGS

Various embodiments in accordance with the present disclosure will be described with reference to the drawings, in which.

DETAILED DESCRIPTION

Figure 1A:
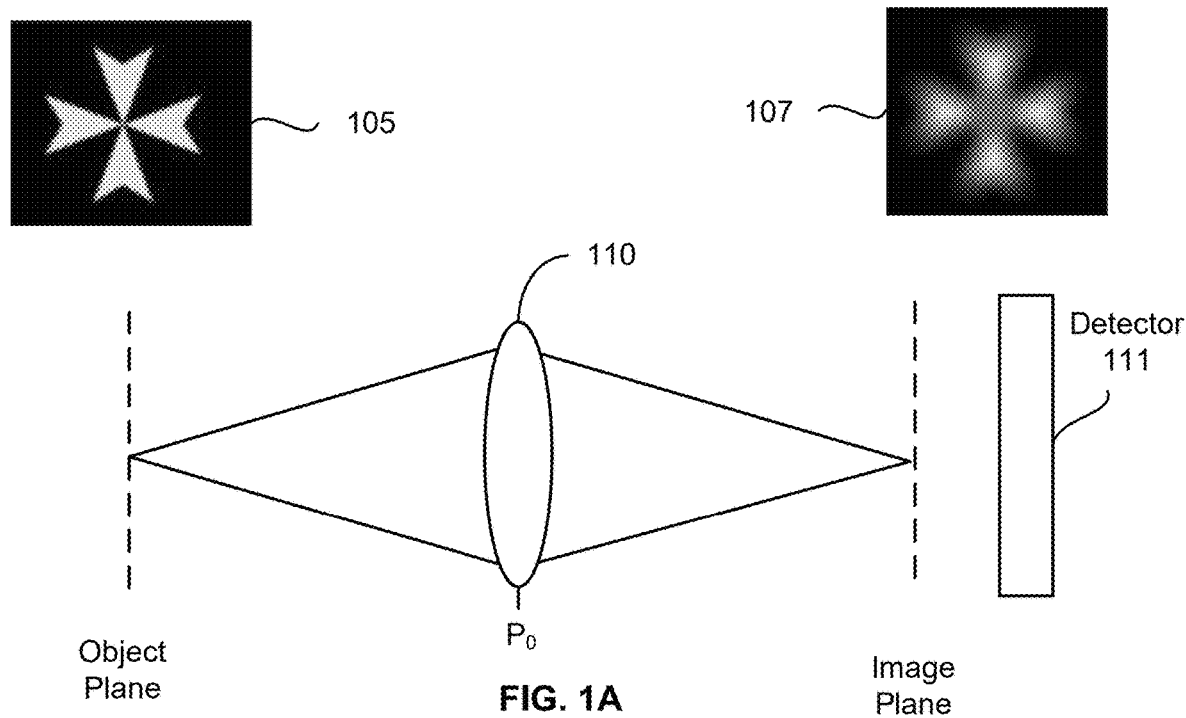
FIGS. 1A and 1B illustrate a lens at an unfocused position and a focused position, respectively, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for auto focusing lenses that are utilized in consumer devices. As described herein, the methods and techniques provided by embodiments of the present disclosure can achieve a focused lens position more quickly, for example, in less steps, than conventional techniques. In an example, the auto focusing of the lens involves associating through focus data of a lens with a predetermined curve, such as a polynomial model, a Gaussian model, or the like. The through focus data is obtained by measuring images of objects captured using the lens at various lens positions. The lens positions, which indicate the location of the lens along an optical axis of the lens, can be represented by the angular orientation of the lens with respect to a housing in which the lens is mounted. For a lens mounted in a threaded mount, as the lens is rotated, the location of the lens along the optical axis shifts in conjunction with the rotation of the lens. Thus, in the examples discussed herein, the angular orientation of the lens, represented by the angle of rotation of the lens with respect to the housing, will be used a measure of the lens location along the optical axis.

Examples of the measurements of the image used by various embodiments of the present disclosure can include a spatial frequency response score associated with each captured image, a variance of a Laplacian image generated from each captured image, or other suitable measures of the sharpness of the captured image. For a variety of curves characterizing the through focus data, the lens can be associated with the curve that is characterized by the smallest error, i.e., the lowest value for curve fitting error, compared to the other curves characterizing the through focus data. An image can then be captured with the lens positioned at a first lens position, for example, a position associated with a first lens angle. A measurement is made using the captured image to determine a focus metric. Based on the measurement, the model associated with the curve can be solved to determine the first lens position. Then, a distance to a peak of the curve, which corresponds to an expected focused lens position, is determined based on the first lens position. The lens is adjusted by moving the lens by an amount equal to the distance between the first lens position and the distance associated with the peak of the curve, resulting in the lens being positioned at the expected focused lens position.

The techniques and systems described herein provide several advantages over conventional auto focusing systems and techniques. For example, the techniques described herein enable focusing a lens in as little as one motion step, thereby reducing computational requirements involved with repeated lens position calculations. The techniques also enable lenses to be set to a predetermined height during manufacturing, which further reduces the number of steps involved in focusing the lens. Polynomial, or other, models are used in determining a distance by which a lens position is to be adjusted. This may result in a more accurate determination of the distance to move the lens, resulting in the lens being moved to an accurately focused position.

Figure 1B:
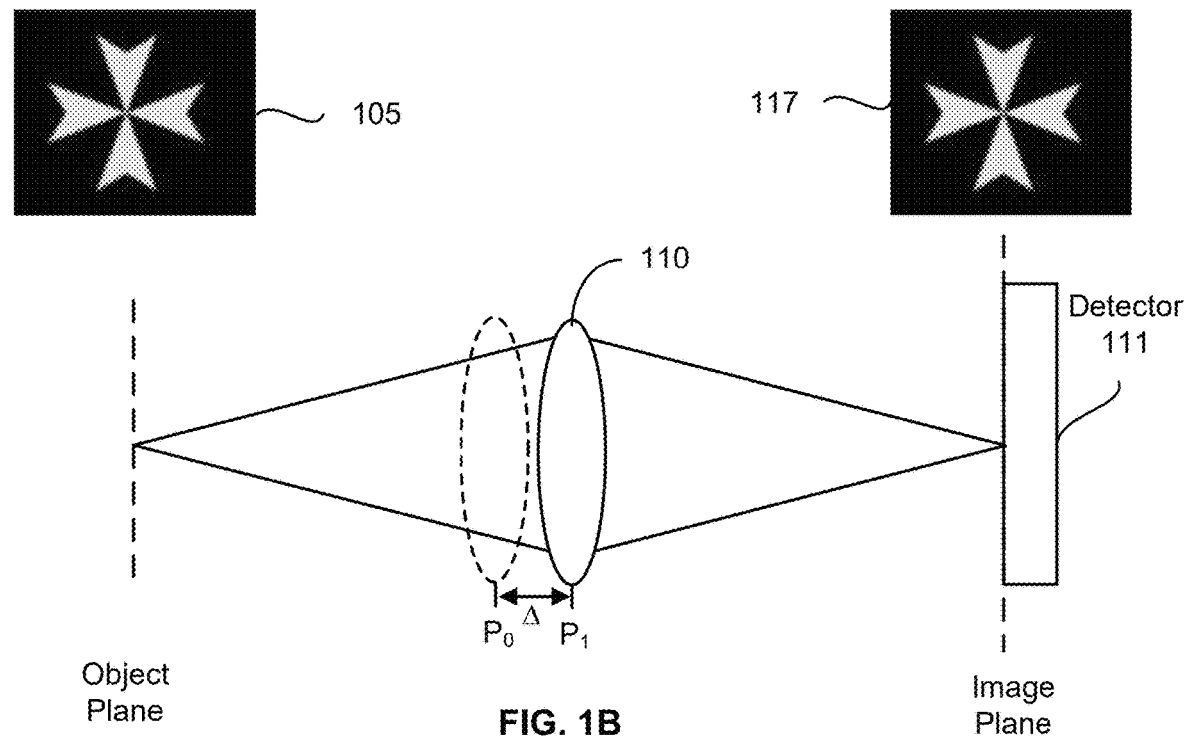

FIGS. 1A and 1B illustrate a lens at an unfocused position $P_0$ and a focused position $P_1$, respectively, according to an embodiment of the present disclosure. As illustrated in FIG. 1A, an object 105 positioned in an object plane is imaged using lens 110 to form an image 107 at an image plane that is positioned in front of detector 111. As a result, image 107 is unfocused or blurry. As will be evident to one of skill in the art, the focus metric, for example, the spatial frequency response associated with image 107 will demonstrate the unfocused nature of image 107.

In order to quickly and accurately move the lens to the position at which the object will be clearly focused, a curve fit model and a measurement of the image 107 captured using the lens are utilized. As described herein, in contrast with conventional techniques that utilized a coarse tuning process followed by fine tuning process to modify the lens position from unfocused position $P_0$ to a focused position $P_1$ is reached, thereby resulting in multiple adjustment steps of the lens position, embodiments of the present disclosure determine the unfocused position $P_0$ of lens 110 based on a model (e.g., a curve fit model) and the image 107 measured using detector 111. Referring to FIG. 1B, a distance Δ between the unfocused position $P_0$ and the focused position $P_1$, at which image 117 is obtained, can then be calculated and the lens can be adjusted from unfocused position $P_0$ to focused position $P_1$ in fewer steps.

Figure 2A:
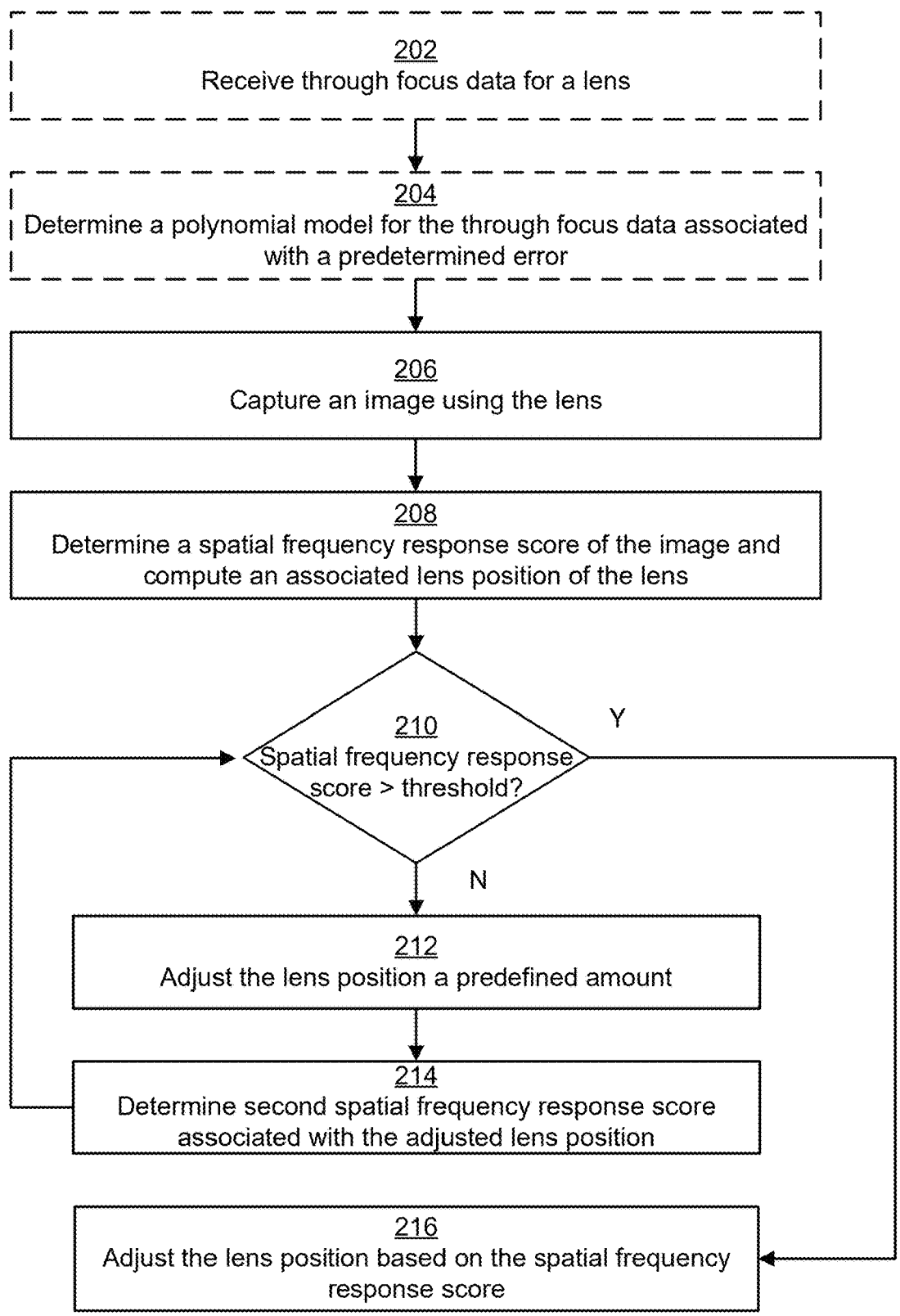
FIG. 2A illustrates an example flow of a process for focusing a lens based on a polynomial model according to an embodiment of the present disclosure.

FIG. 2A illustrates an example flow of a process for focusing a lens based on a polynomial model according to an embodiment of the present disclosure. The flow begins at operation 202, where through focus data for a lens is received. The through focus data can be represented by a curve similar to the through focus curve illustrated in FIG. 3A. The through focus data is generated by moving the lens to each lens position, capturing an image, and determining a spatial frequency response score for each image. The through focus data can be stored in a memory of the camera and retrieved for use during operation of the camera or otherwise determined. One of ordinary skill in the art would recognize many variations, modifications, and alternatives.

The flow continues with operation 204, where a polynomial model associated with a predetermined error, e.g., a minimum or smallest error, for the through focus data is determined. In an exemplary process, the through focus data is compared to a first polynomial model expressed as $y=p0+p1x$, where x represents the lens position (i.e., represented by the lens angle), p0 and p1 are coefficients, and y represents the spatial frequency response score. A root mean square error is then calculated using the first polynomial model and the through focus data. A higher root mean square error indicates a larger difference between the polynomial model and the through focus data. If the root mean square error for the first polynomial model is too high, for example, higher than a predetermined threshold, a second polynomial model expressed as $y=p0+p1x+p2x^2$ can be compared to the through focus data. A root mean square error for the second polynomial model and the through focus data is calculated. This process is repeated using progressively higher polynomial degrees until the root mean square error for the associated polynomial model has been reduced to a small enough value (e.g., below the predetermined threshold).

Alternatively, there may be a maximum degree polynomial model that is to be considered. For example, a ninth-degree polynomial model, corresponding to an equation expressed as $y=p0+p1x+p2x^2+p3x^3+p4x^4+p5x^5+p6x^6+p7x^7+p8x^8+p9x^9$, may be the highest degree polynomial model that is to be compared to the through focus data. Thus, the root mean square error may be determined for the highest degree polynomial model, and for each of the lower degree polynomial models. The polynomial model associated with the smallest root mean square error can then be determined to be the polynomial model that is to be associated with the through focus data.

Alternatively, although some of the higher degree polynomial models may be associated with smaller root mean square errors, for purposes of computational efficiency and reduction in system complexity, a polynomial model having less than the highest degree can be utilized. As an example, it may be determined that a sixth-degree polynomial model may be characterized by a root mean square error that is lower than the predetermined threshold. Thus, although the seventh-degree polynomial model may produce a lower root mean square error than the sixth-degree polynomial model, the sixth-degree polynomial model will be utilized because it provides a root mean square error less than the predetermined threshold at a computational efficiency level lower than the computational efficiency associated with the seventh-degree polynomial model. One of ordinary skill in the art would recognize many variations, modifications, and alternatives.

Similar to the through focus data, the polynomial model that is fit to the through focus data and the polynomial coefficients can be stored in a memory of the camera and retrieved for use during operation of the camera. Thus, the receiving of the through focus data and the determination of the polynomial model associated with a predetermined error for the through focus data can be performed once for the lens and then utilized during operation of the camera over the life of the camera. It should also be noted that the through focus data and the polynomial model that is fit to the through focus data to provide the through focus curve may be based on mathematical models of the lens and not on measurements made using a physical lens. Thus, both through focus curves based on physical lenses and well through focus curves based on mathematical models of lenses are included within the scope of the present disclosure.

In some embodiments, a lens with similar or matching characteristics is utilized for different devices. Accordingly, operations 202 and 204 may be performed a single time in association with a lens and then the polynomial model determined in operation 204 may be stored in a memory for future use, rendering operations 202 and 204 optional. Thus, in some embodiments, polynomial coefficients that have been previously calculated and stored in memory can be utilized in computing the lens position as described herein, reducing computational expense associated with operations 202 and 204.

The flow continues with operation 206, where an image is captured using the lens. The lens is positioned at a first lens position, which corresponds to a first lens angle.

The flow continues with operation 208, where a spatial frequency response score of the image is determined and an associated lens position of the lens is computed. In this example, the lens is positioned at a first position when the image is captured and the associated lens position is the position of the lens associated with the maximum value of the polynomial model corresponding to spatial frequency response score. The polynomial model, for example, the polynomial model that was determined to have the smallest root mean square error of the various polynomial models, can be solved using the spatial frequency response score to determine the associated lens position. That is, $y=\text{SFR}_{score}$ and $y-\text{SFR}_{score}=0$. By solving this equation, the lens position associated with any spatial frequency response score can be computed. Newton's method is an example of a technique that may be used to solve the equation y−SFR$_{score}$=0. Newton's method involves generating a tangent line that is a linear approximation to the through focus data near a first point on the x-axis, i.e., the axis associated with the lens position. A second tangent line is then generated that is a linear approximation of the through focus data near a second point on the x-axis. The second point on the x-axis corresponds to the point where the first tangent line intersects the x-axis. This process is repeated until the root is found to the desired accuracy. The solved equation indicates the spatial frequency response score of the image. Based on the through focus data, the lens position can be determined from the spatial frequency response score.

Figure 3A:
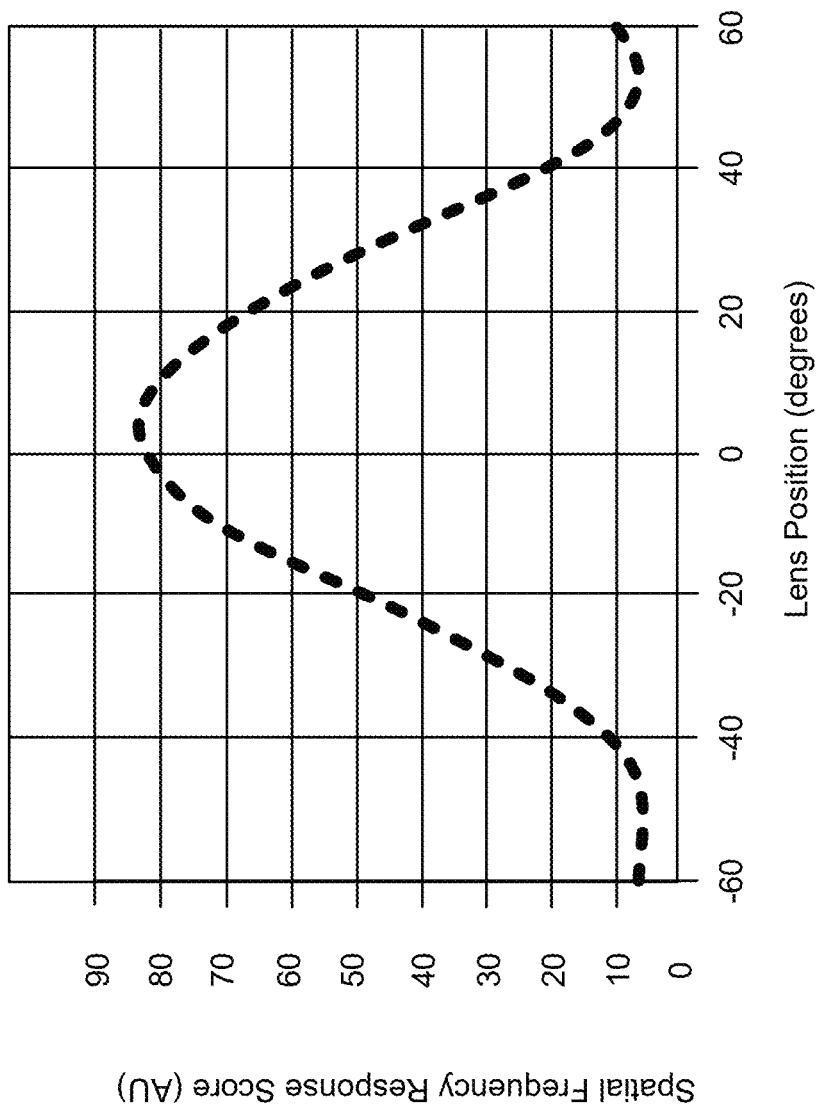
FIG. 3A illustrates an example of through focus data for a lens according to an embodiment of the present disclosure.

The flow continues with operation 210, where it is determined whether the spatial frequency response score is above a threshold score. The threshold score may be based on the lens, and in one example, the threshold score may be a spatial frequency response score of 12. The threshold score may be based on a specification value for the lens. For example, the specification value can be a spatial frequency response score of 60, and subtracting the specification value from the spatial frequency response score may provide another measure of focus. The fact that the spatial frequency response score is lower than the threshold score may indicate that the lens is positioned near an upper or lower end of the lens position range. At these extreme positions, it may be difficult to distinguish the location on the through focus curve, or the particular lens position, with which the image is associated. As an example, the threshold score may be set at a position on the through focus curve that is characterized, for values greater than the threshold score and up to the maximum value, by a shape that is monotonically increasing. Referring to FIG. 3A, for values of the lens position between −50 degrees and −60 degrees, the spatial frequency response score is increasing as the lens position decreases. On the contrary, for lens positions between −40 degrees and 5 degrees, the spatial frequency response score is monotonically increasing. Accordingly, the threshold score can be set at 10 or a value greater than 10, for example, 12, in order to ensure that the spatial frequency response score is monotonically increasing at lens positions greater than the lens position associated with the threshold score. If the spatial frequency response score is above the threshold score, the flow proceeds to operation 216. Otherwise, the flow proceeds to operation 212.

If the spatial frequency response score is lower than the threshold score, the flow continues with operation 212, where the lens position is adjusted by a predefined amount. The predefined amount can be based on the through focus curve for the particular lens. The predefined amount may be an amount determined to adjust the lens position such that a subsequent image captured at the adjusted lens position will have a spatial frequency response score that is greater than the threshold. As an example, the predefined amount for the lens may be 40 degrees. A motor associated with the lens can move the lens the predefined amount. Thus, by adjusting the lens position by this predefined amount, the lens position is adjusted such that the spatial frequency response score associated with the lens position is nearer to the lens position associated with the maximum spatial frequency response score. As an example, referring to FIG. 3A, since the lens position of approximately −40 degrees is associated with a spatial frequency response score of 12, which was utilized as the threshold score and the maximum of the spatial frequency response score corresponds to a lens positions of 5 degrees, the predetermined amount is set at a value less than approximately 45 degrees, for example 40 degrees. Thus, if the measured spatial frequency response score is less than 10, this indicates that the lens position is less than approximately −40 degrees. Accordingly, adjustment of the lens position by 40 degrees will result in the adjusted lens position being in the range between −40 degrees and ~0 degrees, which is a portion of the through focus curve in which the spatial frequency response score is monotonically increasing and lower than the lens position associated with the maximum value. Although a single adjustment by a predefined amount is illustrated in FIG. 2A, two or more adjustments by equal or different predefined amounts may be utilized and are included with in the scope of the present disclosure.

The flow continues with operation 214, where a second spatial frequency response score associated with the adjusted lens position is determined. A second image can be captured at the adjusted lens position, the second spatial frequency response score can be determined for the second image, and the polynomial model can be solved using the second spatial frequency response score to determine the adjusted lens position. The coefficients of the polynomial model can be read from the memory to determine the adjusted lens position.

The flow continues with operation 216, where the lens position is adjusted based on the spatial frequency response score if the spatial frequency response score was above the threshold score at operation 210 or based on the second spatial frequency response score if operations 212 and 214 were utilized. A distance from the current lens position to a peak lens position, i.e., the lens position represented by the lens angle corresponding to the peak of the polynomial model, can be calculated based on the polynomial model and the current lens position. The lens can then be adjusted using the distance so that the adjusted lens position (i.e., the lens angle) corresponds to the peak lens position, thereby being associated with the maximum spatial frequency response score. Thus, at the peak lens position, the lens can be considered to be optimally focused. The motor associated with the lens can move the lens to the focused lens position.

In some examples, such as during a quality analysis of the auto focus system, an additional image can be captured with the lens subsequent to the lens being adjusted to the peak lens position. A measurement, such as a spatial frequency response score, for the additional image can then be determined. The spatial frequency response score can be compared to a specification value of a known maximum spatial frequency response score. If the spatial frequency response score is below the specification value, the lens may be determined to be an inadequate product. As a result, the lens can be rejected for subsequent image capture, remanufactured and retested using embodiments of the present disclosure, or the like.

It should be appreciated that the specific steps illustrated in FIG. 2A provide a particular method of focusing a lens based on a polynomial model according to an embodiment of the present disclosure. Other sequences of steps may also be performed according to alternative embodiments. For example, alternative embodiments of the present disclosure may perform the steps outlined above in a different order. Moreover, the individual steps illustrated in FIG. 2A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2B:
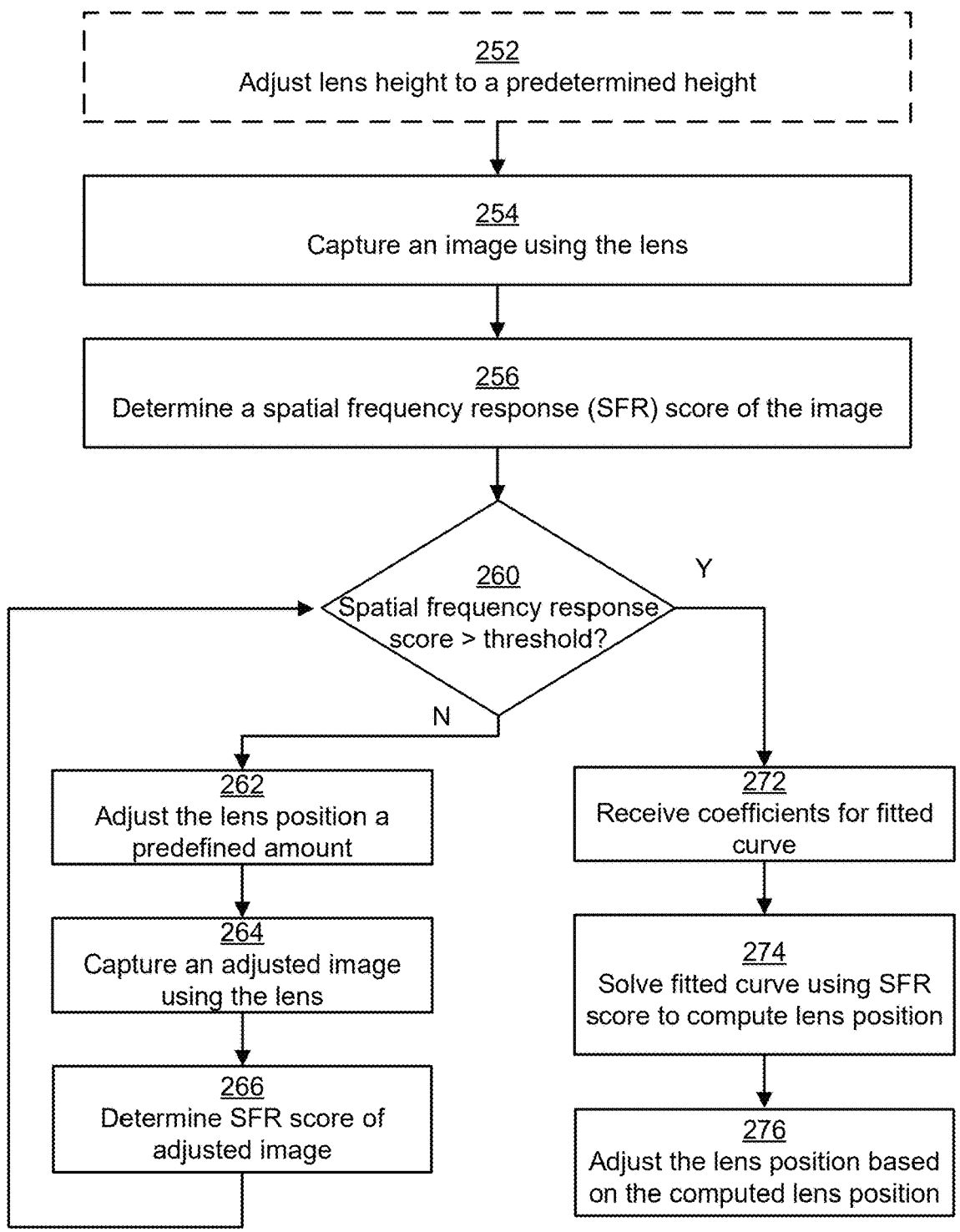
FIG. 2B illustrates an alternative example flow of a process for focusing a lens based on a polynomial model according to an embodiment of the present disclosure.

FIG. 2B illustrates an alternative example flow of a process for focusing a lens based on a polynomial model according to an embodiment of the present disclosure. The flow begins at operation 252, where the lens height is adjusted to a predetermined height. The predetermined height, which can be referred to as an assembly height, is discussed more fully in relation to FIG. 6. In some embodiments operation 252 is optional and the lens is provided by the lens vendor with the lens set at the predetermined height, enabling operation 252 to be optional. The flow continues at operation 254, where an image is captured using the lens. The lens is positioned at a first lens position corresponding to the predetermined height, which corresponds to a first lens angle.

The flow continues with operation 256, where a spatial frequency response score of the image is determined. The flow continues with operation 260, where it is determined whether the spatial frequency response score is above a threshold score. The threshold score may be based on the lens, and in one example, the threshold score may be a spatial frequency response score of 12. The threshold score may be based on a specification value for the lens. For example, the specification value can be a spatial frequency response score of 60, and subtracting the specification value from the spatial frequency response score may provide another measure of focus. The fact that the spatial frequency response score is lower than the threshold score may indicate that the lens is positioned near an upper or lower end of the lens position range. At these extreme positions, it may be difficult to distinguish the location on the through focus curve, or the particular lens position, with which the image is associated. If the spatial frequency response score is above the threshold score, the flow proceeds to operation 272. Otherwise, the flow proceeds to operation 262.

If the spatial frequency response score is lower than the threshold score, the flow continues with operation 262, where the lens position is adjusted by a predefined amount. The predefined amount can be based on the through focus curve for the particular lens. The predefined amount may be an amount determined to adjust the lens position such that a subsequent image captured at the adjusted lens position will have a spatial frequency response score that is greater than the threshold. As an example, the predefined amount for the lens may be 40 degrees. A motor associated with the lens can move the lens the predefined amount. Thus, by adjusting the lens position by this predefined amount, the lens position is adjusted such that the spatial frequency response score associated with the lens position is nearer to the lens position associated with the maximum spatial frequency response score. As an example, referring to FIG. 3A, since the lens position of approximately −40 degrees is associated with a spatial frequency response score of 12, which was utilized as the threshold score and the maximum of the spatial frequency response score corresponds to a lens positions of 5 degrees, the predetermined amount is set at a value less than approximately 45 degrees, for example 40 degrees. Thus, if the measured spatial frequency response score is less than 10, this indicates that the lens position is less than approximately-40 degrees. Accordingly, adjustment of the lens position by 40 degrees will result in the adjusted lens position being in the range between −40 degrees and ~0 degrees, which is a portion of the through focus curve in which the spatial frequency response score is monotonically increasing and lower than the lens position associated with the maximum value. Although a single adjustment by a predefined amount is illustrated in FIG. 2B, two or more adjustments by equal or different predefined amounts may be utilized and are included with in the scope of the present disclosure.

The flow continues with operation 264, where an image is captured at the adjusted lens position. This image can be referred to as an adjusted image indicating that the image is captured after the lens position has been adjusted in operation 262. The flow continues with operation 266, where a second spatial frequency response score associated with the adjusted lens position is determined. This second spatial frequency response score is then utilized in operation 260, where the second spatial frequency response score is compared to the threshold score. The process of lens position adjustment (operation 262), image capture (operation 264), and determination of spatial frequency response score is repeated until the spatial frequency response is greater than the threshold score.

The flow continues with operation 272, where the polynomial model that is fit to the through focus data is obtained, for example, read from a memory of the camera and thus retrieved for use during operation of the camera. The flow continues at operation 274, where the lens position is determined by solving the polynomial model using the spatial frequency response score to determine the lens position. That is, y=SFR$_{score}$ and y−SFR$_{score}$=0. By solving this equation, the lens position associated with any spatial frequency response score can be computed. Newton's method is an example of a technique that may be used to solve the equation y−SFR$_{score}$=0. Newton's method involves generating a tangent line that is a linear approximation to the through focus data near a first point on the x-axis, i.e., the axis associated with the lens position. A second tangent line is then generated that is a linear approximation of the through focus data near a second point on the x-axis. The second point on the x-axis corresponds to the point where the first tangent line intersects the x-axis. This process is repeated until the root is found to the desired accuracy. The solved equation indicates the spatial frequency response score of the image. Based on the through focus data, the lens position can be determined from the spatial frequency response score.

The flow continues at operation 276, where a distance from the current lens position to a peak lens position, i.e., the lens position represented by the lens angle corresponding to the peak of the polynomial model, can be calculated based on the polynomial model and the current lens position. The lens can then be adjusted using the distance so that the adjusted lens position (i.e., the lens angle) corresponds to the peak lens position, thereby being associated with the maximum spatial frequency response score. Thus, at the peak lens position, the lens can be considered to be optimally focused. The motor associated with the lens can move the lens to the focused lens position.

Although the use of polynomial models is described in FIG. 2B, other examples may use Gaussian models, additive models, or other linear or nonlinear models to fit the through focus data and generate the through focus curve useful in solving for the lens position associated with the optimal focus position. Therefore, embodiments of the present invention are not limited to the use of polynomial models and their use in FIG. 2B is merely exemplary.

It should be appreciated that the specific steps illustrated in FIG. 2B provide a particular alternative method of focusing a lens based on a polynomial model according to an embodiment of the present disclosure. Other sequences of steps may also be performed according to alternative embodiments. For example, alternative embodiments of the present disclosure may perform the steps outlined above in a different order. Moreover, the individual steps illustrated in FIG. 2B may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3A illustrates an example of through focus data for a lens according to an embodiment of the present disclosure. Auto focusing generally involves a process of adjusting a positon of a camera's lens to focus on a subject such that, when an image is generated, the image shows the subject with sharpness. An auto focus system of the camera includes a set of sensors and a control system to adjust the position. The control system may involve a motor to adjust the position of the lens. The sensor set is used to generate sensor data, which can be referred to as focus data, that the control system processes to determine a proper position of the lens characterized by the best focus. The set of sensors can include optical sensors and the sensor data can include image data.

To generate a through focus curve as illustrated in FIG. 3A, a series of images are captured, with each image being captured with the lens positioned at each possible lens position. As illustrated in FIG. 3A, the lens may be positioned between lens angles of −60 degrees to 60 degrees. As discussed above, the lens position, measured as the lens angle, characterizes the angular orientation of the lens with respect to the housing in which the lens is mounted. For a lens mounted in a threaded housing, as the lens angle is changed, the lens translates along the optical axis of the lens, thus changing the distance between the lens and the image sensor of the camera. Although the through focus data illustrated in FIG. 3A is provided over a range of 120 degrees in limited degree increments, for example, increments of 1 degree, this is not required and other examples of through focus data may involve a larger or smaller range of lens positions and larger or smaller increments.

The control system can be used to determine a focus score, for example, a spatial frequency response score, of each image. The focus score is illustrated by the spatial frequency response score represented on the ordinate axis (i.e., the y-axis) in FIG. 3A. As shown in Table 1, which corresponds to the data presented in the through focus curve illustrated in FIG. 3A, each lens position (represented on the abscissa axis) is associated with a focus score in the form of a spatial frequency response score (represented on the ordinate axis). The through focus curve is then generated from the lens positions and associated focus scores. Table 1 illustrates spatial frequency response scores for lens positions.

TABLE 1

| Lens Position (degrees) | SFR Score (AU) |
| --- | --- |
| −60 | 6.175402 |
| −59 | 6.012611 |
| −58 | 6.414327 |
| −57 | 6.375265 |
| −56 | 6.432301 |
| −55 | 6.532028 |
| −54 | 5.567338 |
| −53 | 5.853346 |
| −52 | 5.451294 |
| −51 | 5.640176 |
| −50 | 6.068148 |
| −49 | 5.618054 |

TABLE 1-continued

| Lens Position (degrees) | SFR Score (AU) |
| --- | --- |
| −48 | 5.454844 |
| −47 | 6.307865 |
| −46 | 6.023437 |
| −45 | 6.866056 |
| −44 | 7.292426 |
| −43 | 8.444039 |
| −42 | 8.67714 |
| −41 | 9.865106 |
| −40 | 10.671658 |
| −39 | 12.191368 |
| −38 | 13.236316 |
| −37 | 14.726707 |
| −36 | 16.620808 |
| −35 | 18.415371 |
| −34 | 19.426107 |
| −33 | 21.297422 |
| −32 | 23.121105 |
| −31 | 25.523951 |
| −30 | 27.189707 |
| −29 | 29.52878 |
| −28 | 31.72555 |
| −27 | 33.93335 |
| −26 | 35.308914 |
| −25 | 37.856205 |
| −24 | 39.79528 |
| −23 | 42.361427 |
| −22 | 45.093006 |
| −21 | 47.120647 |
| −20 | 49.043106 |
| −19 | 51.73872 |
| −18 | 53.825115 |
| −17 | 56.3563 |
| −16 | 59.008842 |
| −15 | 61.41584 |
| −14 | 63.590256 |
| −13 | 65.615501 |
| −12 | 67.714462 |
| −11 | 69.138939 |
| −10 | 71.105423 |
| −9 | 72.440948 |
| −8 | 74.498688 |
| −7 | 76.117653 |
| −6 | 76.828102 |
| −5 | 77.974976 |
| −4 | 79.176239 |
| −3 | 80.040787 |
| −2 | 81.053078 |
| −1 | 81.697372 |
| 0 | 82.49678 |
| 1 | 82.692314 |
| 2 | 82.83963 |
| 3 | 82.942284 |
| 4 | 82.891136 |
| 5 | 83.03035 |
| 6 | 82.506577 |
| 7 | 82.166367 |
| 8 | 81.488045 |
| 9 | 80.16037 |
| 10 | 80.267586 |
| 11 | 79.186295 |
| 12 | 78.302177 |
| 13 | 77.220467 |
| 14 | 75.780945 |
| 15 | 74.616798 |
| 16 | 72.830994 |
| 17 | 71.767525 |
| 18 | 70.060722 |
| 19 | 68.243431 |
| 20 | 66.559219 |
| 21 | 64.732559 |
| 22 | 62.33849 |
| 23 | 60.567635 |
| 24 | 58.231457 |
| 25 | 55.373367 |
| 26 | 53.301941 |
| 27 | 50.819317 |
| 28 | 48.714664 |
| 29 | 46.665375 |

TABLE 1-continued

| Lens Position (degrees) | SFR Score (AU) |
|---|---|
| 30 | 44.078308 |
| 31 | 42.073196 |
| 32 | 39.361084 |
| 33 | 37.113045 |
| 34 | 34.979961 |
| 35 | 32.093307 |
| 36 | 30.282351 |
| 37 | 27.910547 |
| 38 | 25.28301 |
| 39 | 23.186146 |
| 40 | 21.30707 |
| 41 | 19.547438 |
| 42 | 17.640162 |
| 43 | 15.889221 |
| 44 | 13.910646 |
| 45 | 12.106042 |
| 46 | 10.997364 |
| 47 | 9.620197 |
| 48 | 8.389129 |
| 49 | 7.592216 |
| 50 | 7.197614 |
| 51 | 6.424972 |
| 52 | 6.06305 |
| 53 | 6.290286 |
| 54 | 6.710607 |
| 55 | 7.147128 |
| 56 | 7.790603 |
| 57 | 8.530298 |
| 58 | 8.638059 |
| 59 | 8.96201 |
| 60 | 9.818191 |

As illustrated in FIG. 3A and Table 1, the maximum spatial frequency response score of 83.03035 (measured in arbitrary units) is associated with a maximally-focused image, and therefore, an optimal lens position. The through focus curve in FIG. 3A has a maximum spatial frequency response score at a lens position of 5 degrees.

Although the spatial frequency response score is utilized as the focus score in Table 1 and FIG. 3A, this is not required and other focus metrics could be utilized, including a variance of a Laplacian image, a gradient energy, a Gaussian derivative, a gray-level variance, a local binary pattern measurement, or the like. Thus, it should be appreciated that the use of spatial frequency response score is merely exemplary and other suitable focus metrics can be utilized in the generation of the through focus curve.

The through focus curve is associated with a particular lens. Thus, a different through focus curve may be generated for each lens. The spatial frequency response scores associated with the lens positions may vary for the lenses. As a result, a first lens may have a maximum spatial frequency response score at a first lens position, and a second lens may have a maximum spatial frequency response score at a second lens position.

Conventional auto focusing techniques involve coarse to fine searching of focus scores and lens positions. An image is captured at a first lens position and a spatial frequency response score is determined for the image. The control system of the camera accesses a score step table that includes predefined adjustments of how much the lens is to be moved based on the spatial frequency response score. For example, a low spatial frequency response score may be associated with a larger number of degrees of movement compared to a higher spatial frequency response score. The lens is then adjusted based on the predefined adjustment and a second image is captured. The control system determines a second spatial frequency response score. The control system accesses the score step table again to determine the predefined adjustment based on the second spatial frequency response score. The lens is once again adjusted based on the score step table. This process is repeated until an exit condition, such as the spatial frequency response score being within a predefined amount of the maximum spatial frequency response score for the lens is met. Typically, conventional auto focusing techniques can involve more than ten adjustments before the lens is determined to be at a focused position.

Figure 3B:
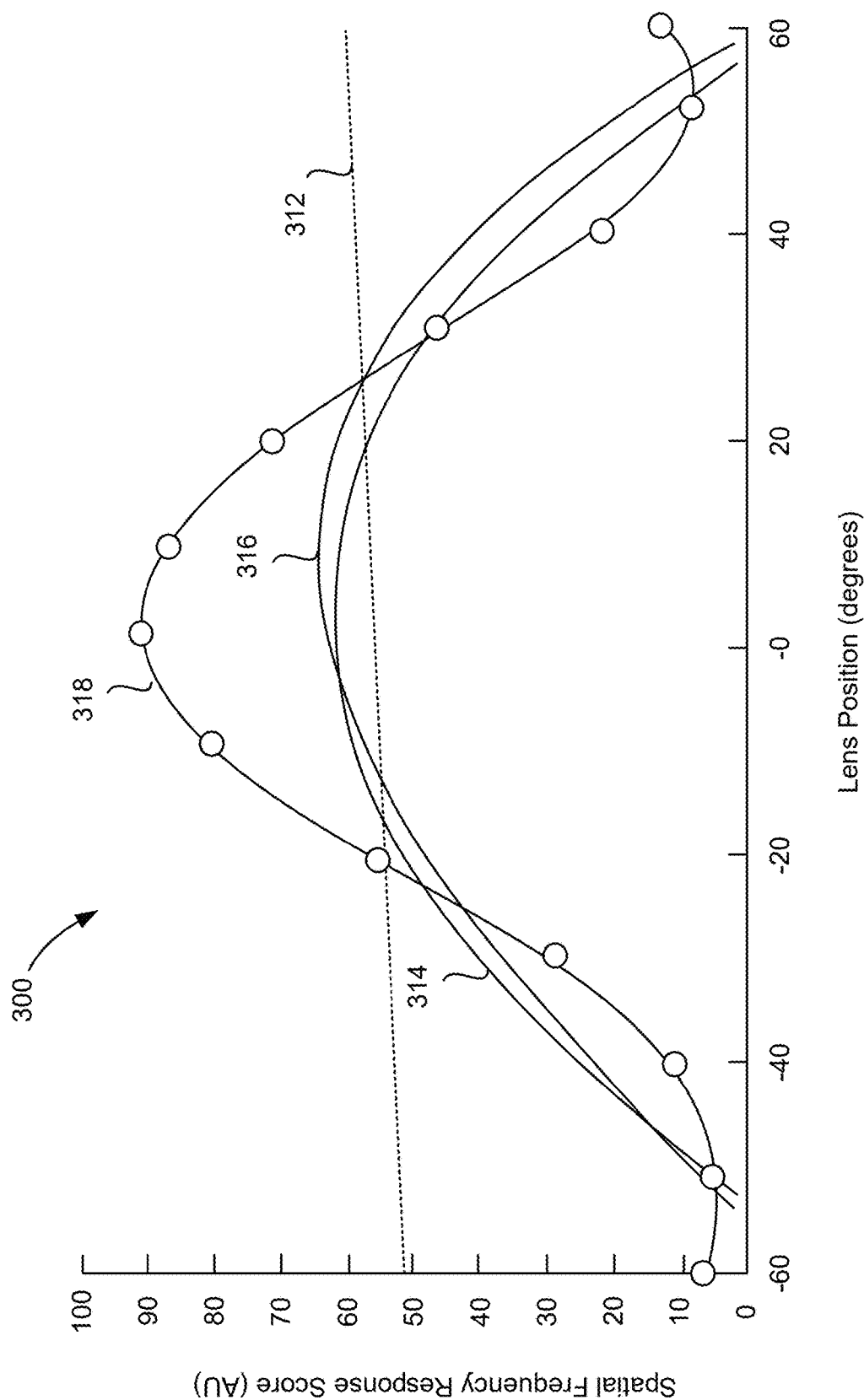
FIG. 3B illustrates an example of a graph of through focus data and polynomial models for a lens according to an embodiment of the present disclosure.

FIG. 3B illustrates an example of a graph 300 of through focus data and polynomial models for a lens according to an embodiment of the present disclosure. The through focus data is represented as dots on the graph 300 at various lens positions. The polynomial models shown in the graph are a first-degree polynomial model 312, a second-degree polynomial model 314, a third-degree polynomial model 316, and a ninth-degree polynomial model 318. For the through focus data illustrated in FIG. 3B, the inventors determined the root mean square errors associated with each of the illustrated polynomial models, as well as the root mean square errors for additional polynomial models. The root mean square error values, listed in the order of ascending polynomial degree, are as follows. The first-degree polynomial model 312 is associated with a root mean square error of 28.6534, the second-degree polynomial model 314 is associated with a root mean square error of 12.0651, the third-degree polynomial model 316 is associated with a root mean square error of 11.4437, the fourth-degree polynomial model (not shown) is associated with a root mean square error of 2.535, the fifth-degree polynomial model (not shown) is associated with a root mean square error of 1.6757, the sixth-degree polynomial model (not shown) is associated with a root mean square error of 0.4626, the seventh-degree polynomial model (not shown) is associated with a root mean square error of 0.4, the eighth-degree polynomial model (not shown) is associated with a root mean square error of 0.4007, and the ninth-degree polynomial model 318 is associated with a root mean square error of 0.3535. Based on the root mean square error values, the ninth-degree polynomial model 318 fits the through focus data for the lens the best (i.e., with the smallest value for the root mean square error) compared to the other polynomial models. As the error values decrease to low levels, the benefit of reducing the error further is offset by the increased computational cost, enabling embodiments of the present disclosure to utilize a polynomial model that fits the through focus data with an error less than a threshold (e.g., 0.02 root mean square error) as appropriate to the particular application. Although examples are described in terms of the root mean square error, other measures of error can be utilized and are included with the scope of the present disclosure.

Although polynomial models are described in FIG. 3B, other examples may use Gaussian models, additive models, or other linear or nonlinear models to fit the through focus data and generate the through focus curve useful in solving for the lens position associated with the optimal focus position.

FIGS. 4A-4D illustrate examples of auto focusing a lens based on a spatial frequency response score of an image according to an embodiment of the present disclosure. Four different examples are shown to demonstrate the ability to adjust a lens position from various initial lens positions.

Figure 4A:
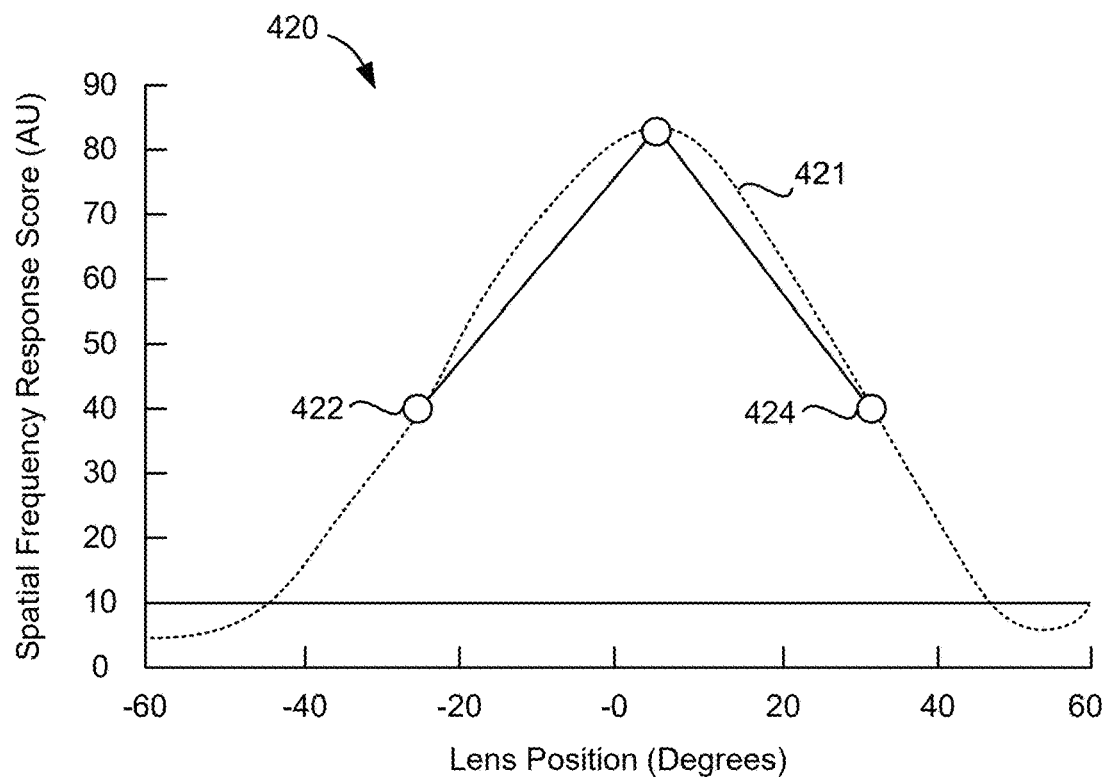
FIGS. 4A-4D illustrate examples of auto focusing a lens based on a spatial frequency response score of an image according to an embodiment of the present disclosure.

FIG. 4A illustrates a graph 420, which is a plot showing the spatial frequency response score as a function of lens position (measured in lens angle) and a polynomial model that has been fit to the through focus data. As illustrated in graph 420, a spatial frequency response score 422 for an image captured using the lens is determined to be SFR=40. Using the spatial frequency response score 422 with a value of SFR=40 and the polynomial model 421 fit to the through focus data, the polynomial model is solved to determine that the current lens position, represented in lens angle, of the lens is-24.18 degrees. By solving the polynomial model 421, the distance from the current lens position to the lens position associated with the peak of the curve representing the polynomial model is then determined to be 29.18 degrees, since the peak of the curve representing the polynomial model is known to be at 5 degrees. The peak of the curve representing the polynomial model corresponds to a focused lens position at which a captured image is expected to be optimally focused. The lens position is adjusted by 29.18 degrees. Another image can then be captured and a corresponding spatial frequency response score can be determined. The calculations may be repeated to determine whether additional adjustments are to be made to the lens position.

In some embodiments, the focused lens position is generally located near the lens angle of zero degrees. As illustrated in graph 420, the focused lens position is at 5 degrees. For a given spatial frequency response score, for example, a spatial frequency response score of 40, the current lens position may be less than the focused lens position, as illustrated by spatial frequency response score 422. Alternatively, the current lens position may be greater than the focused lens position, as illustrated by spatial frequency response score 424 in graph 420. Embodiments of the present disclosure can measure the spatial frequency score and move the lens to an increased lens position as illustrated by the motion from −24.18 degrees to 5 degrees. If, based on the spatial frequency response score of SFR=40, it was determined by solving the polynomial model that the lens was positioned at a lens positon of 34.18 degrees, then motion of the lens position by 29.18 degrees would result in the current spatial frequency response score decreasing, not increasing. This would be an indication that the lens position needed to be decreased by 29.18 degrees to arrive at adjusted lens position of 5 degrees. Similarly, motion of the lens position by −29.18 degrees, starting from the current lens position of −24.18 degrees, would result in the current spatial frequency response score decreasing, not increasing. This would be an indication that the lens position needed to be increased by 29.18 degrees to arrive at adjusted lens position of 5 degrees. Thus, if an initial motion results in a decrease in the spatial frequency response score, the subsequent motion can be equal to twice the initial motion and in the opposite direction in order to arrive at the lens position associated with optimal focus.

Figure 4B:
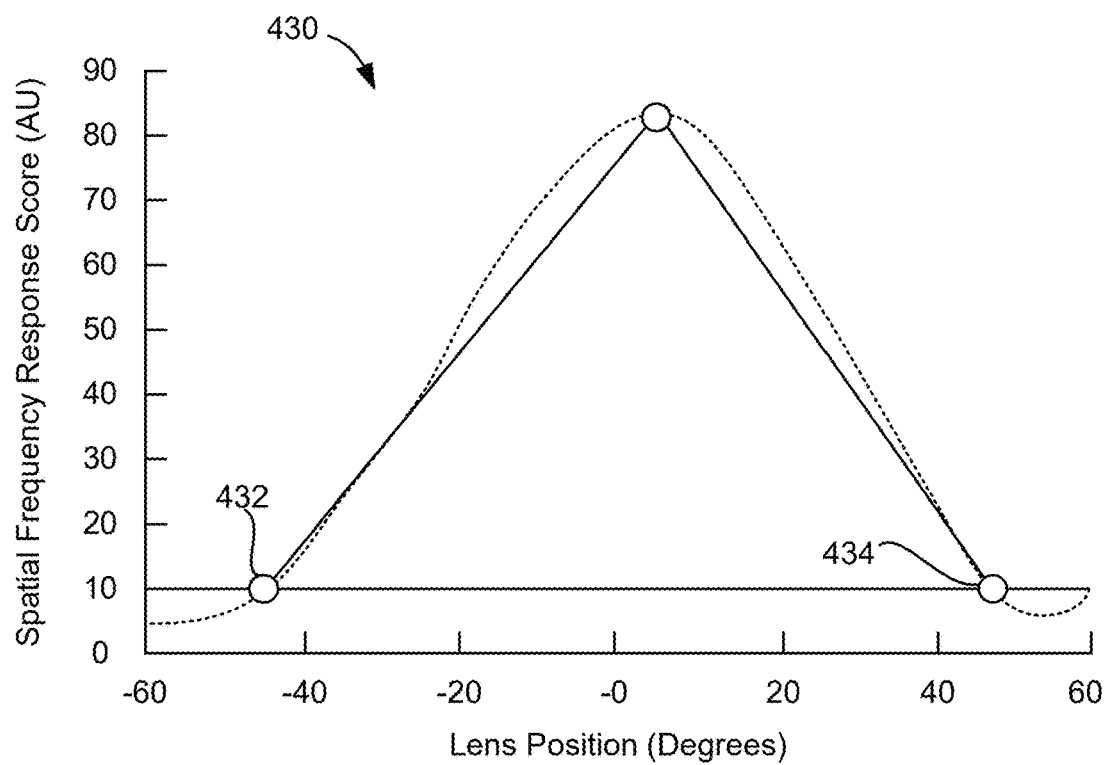

FIG. 4B illustrates a graph 430, which is a plot showing the spatial frequency response score as a function of lens position (measured in lens angle) and a polynomial model that has been fit to the through focus data. The focused lens position is at 5 degrees. For a given spatial frequency response score, the current lens position may be less than the focused lens position, as illustrated by spatial frequency response score 432. Alternatively, the current lens position may be greater than the focused lens position, as illustrated by spatial frequency response score 434 in graph 430. Embodiments of the present disclosure can measure the spatial frequency score and move the lens to an increased lens position as illustrated by the motion from −40.9 degrees to 5 degrees. If, based on the spatial frequency response score of SFR=10.01, it was determined by solving the polynomial model that the lens was positioned at a lens positon of 50.9 degrees, then motion of the lens position by 45.9 degrees would result in the current spatial frequency response score decreasing, not increasing. This would be an indication that the lens position needed to be decreased by 45.9 degrees to arrive at adjusted lens position of 5 degrees. Similarly, motion of the lens position by −45.9 degrees, starting from the current lens position of −40.9 degrees, would result in the current spatial frequency response score decreasing, not increasing. This would be an indication that the lens position needed to be increased by 40.9 degrees to arrive at adjusted lens position of 5 degrees. Thus, if an initial motion results in a decrease in the spatial frequency response score, the subsequent motion can be equal to twice the initial motion and in the opposite direction in order to arrive at the lens position associated with optimal focus.

Figure 4C:
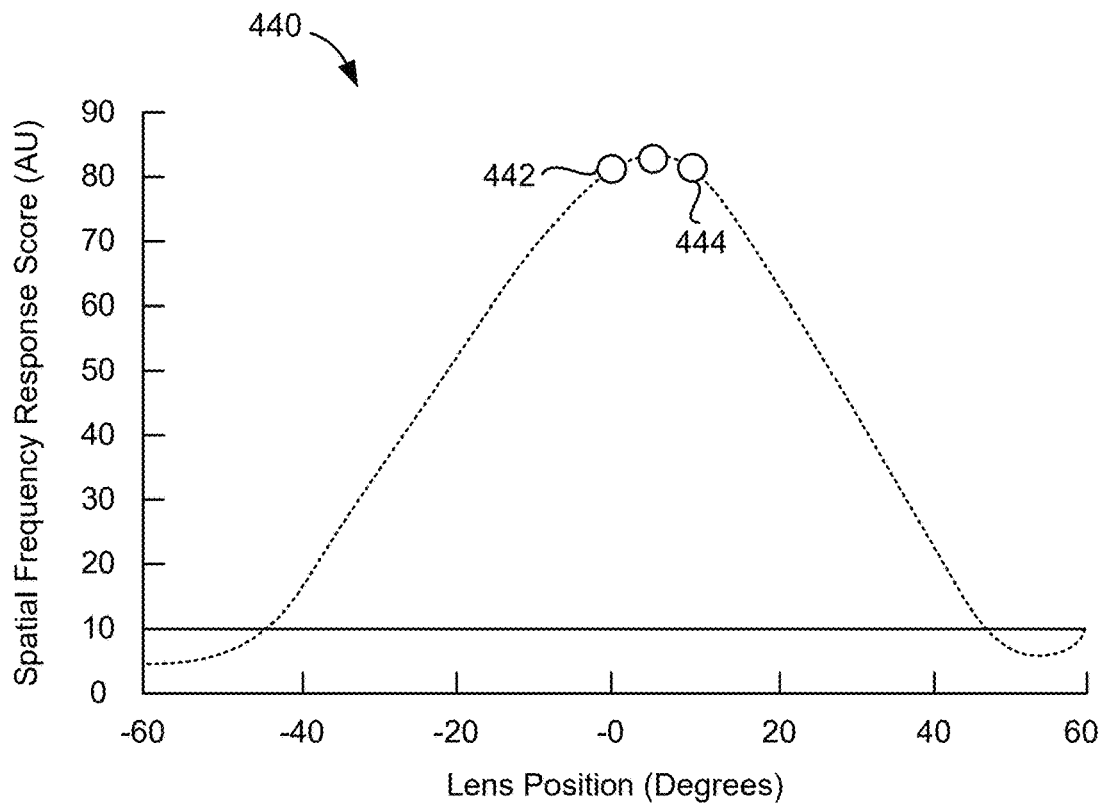

FIG. 4C illustrates a graph 440, which is a plot showing the spatial frequency response score as a function of lens position (measured in lens angle) and a polynomial model that has been fit to the through focus data. The focused lens position is at 5 degrees. For a given spatial frequency response score, the current lens position may be less than the focused lens position, as illustrated by spatial frequency response score 442. Alternatively, the current lens position may be greater than the focused lens position, as illustrated by spatial frequency response score 444 in graph 440. Embodiments of the present disclosure can measure the spatial frequency score and move the lens to an increased lens position as illustrated by the motion from −0.22235 degrees to 5 degrees. If, based on the spatial frequency response score of SFR=82, it was determined by solving the polynomial model that the lens was positioned at a lens positon of 10.2224 degrees, then motion of the lens position by 5.2224 degrees would result in the current spatial frequency response score decreasing, not increasing. This would be an indication that the lens position needed to be decreased by 5.2224 degrees to arrive at adjusted lens position of 5 degrees. Similarly, motion of the lens position by −5.2224 degrees, starting from the current lens position of −0.22235 degrees, would result in the current spatial frequency response score decreasing, not increasing. This would be an indication that the lens position needed to be increased by 5.2224 degrees to arrive at adjusted lens position of 5 degrees. Thus, if an initial motion results in a decrease in the spatial frequency response score, the subsequent motion can be equal to twice the initial motion and in the opposite direction in order to arrive at the lens position associated with optimal focus.

Figure 4D:
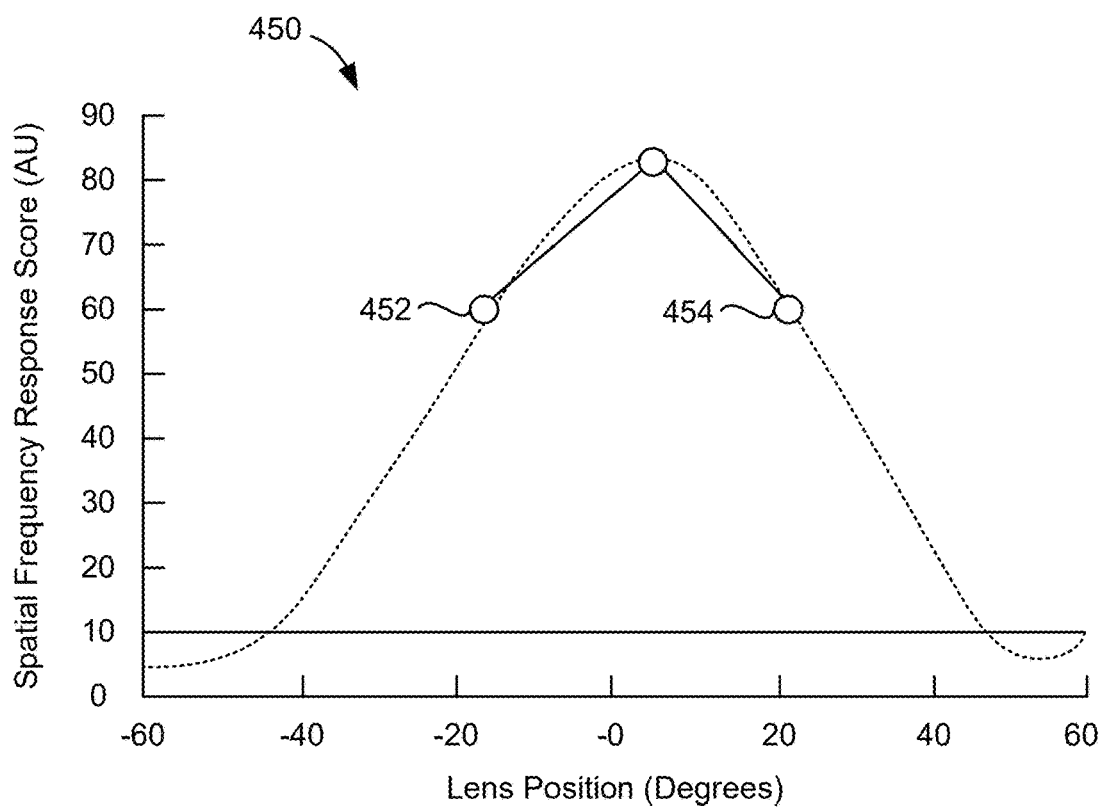

FIG. 4D illustrates a graph 450, which is a plot showing the spatial frequency response score as a function of lens position (measured in lens angle) and a polynomial model that has been fit to the through focus data. The focused lens position is at 5 degrees. For a given spatial frequency response score, the current lens position may be less than the focused lens position, as illustrated by spatial frequency response score 452. Alternatively, the current lens position may be greater than the focused lens position, as illustrated by spatial frequency response score 454 in graph 450. Embodiments of the present disclosure can measure the spatial frequency score and move the lens to an increased lens position as illustrated by the motion from −20 degrees to 5 degrees. If, based on the spatial frequency response score of SFR=60, it was determined by solving the polynomial model that the lens was positioned at a lens positon of 20 degrees, then motion of the lens position by 15 degrees would result in the current spatial frequency response score decreasing, not increasing. This would be an indication that the lens position needed to be decreased by 15 degrees to arrive at adjusted lens position of 5 degrees. Similarly, motion of the lens position by −15 degrees, starting from the current lens position of −20 degrees, would result in the current spatial frequency response score decreasing, not increasing. This would be an indication that the lens position needed to be increased by 15 degrees to arrive at adjusted lens position of 5 degrees. Thus, if an initial motion results in a decrease in the spatial frequency response score, the subsequent motion can be equal to twice the initial motion and in the opposite direction in order to arrive at the lens position associated with optimal focus.

Figure 5A:
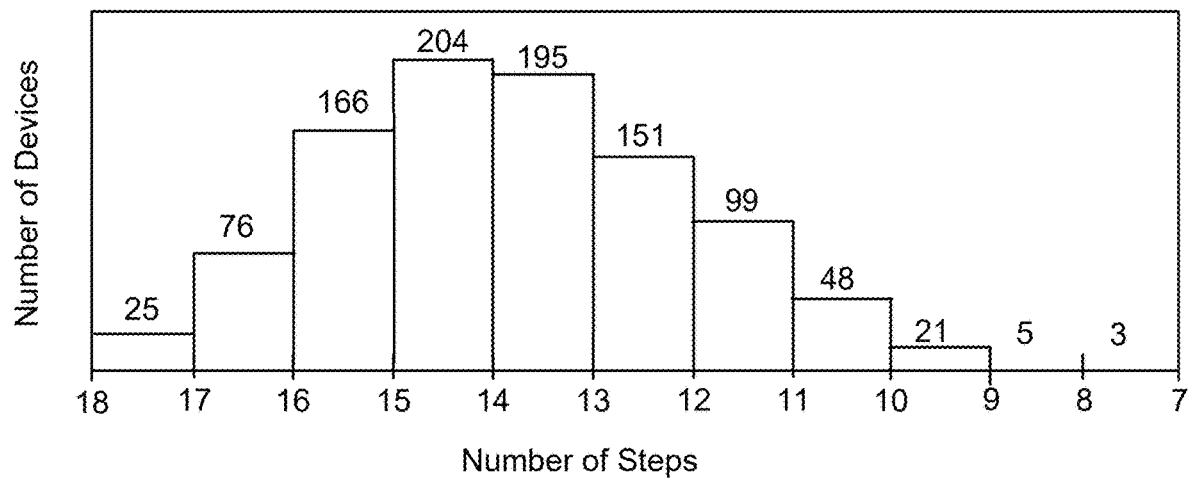
FIG. 5A is a histogram illustrating example results for auto focusing of a lens using a conventional method.
Figure 5B:
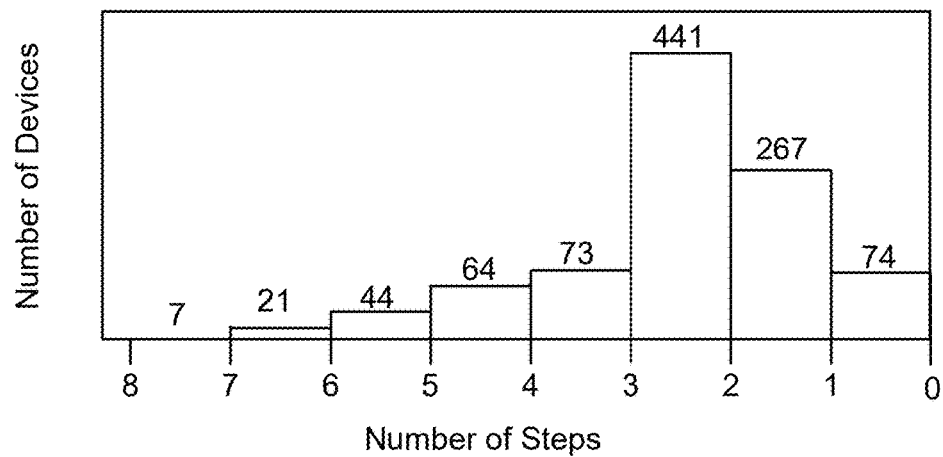
FIG. 5B is a histogram illustrating example results for auto focusing of a lens according to an embodiment of the present disclosure.

FIG. 5A is a histogram illustrating example results for auto focusing of a lens using a conventional method. FIG. 5B is a histogram illustrating example results for auto focusing of a lens according to an embodiment of the present disclosure. The results are based on 1,000 trials using the conventional auto focusing method and 1,000 trials using the auto focus method of the present disclosure. For the conventional method, the mean number of steps to reach a lens position determined to be within an acceptable range of the optimally focused lens position was 13.281 steps. Alternatively, utilizing the methods described herein, the mean number of steps to reach a lens position determined to be within an acceptable range of the optimally focused lens position was 2.1 steps. Accordingly, on average, embodiments of the present disclosure enable the lens to be moved to the optimally focused lens position using 11.181 fewer steps than the conventional method.

Table 2 illustrates quantiles for the number of steps and summary statistics corresponding to the plots illustrated in FIGS. 5A and 5B. As illustrated in Table 2, the 75% quantile for the number of steps utilized by the conventional method is 15, whereas using embodiments of the present disclosure, the 75% quantile for the number of steps is reduced to 2. Similar decreases are observed for the 50% quantile as well as the 25% quantile. Not only is the mean number of steps reduced by using embodiments of the present disclosure, but the standard deviation in the number of steps decreases from 1.903 to 1.500, and the mean of the standard error decreases from 0.0602 to 0.0474.

TABLE 2

| Quantiles | | | Quantiles | | |
|---|---|---|---|---|---|
| 100.0% | Maximum | 19 | 100.0% | Maximum | 12 |
| 99.5% | | 18 | 99.5% | | 8 |
| 97.5% | | 17 | 97.5% | | 6 |
| 90.0% | | 16 | 90.0% | | 4 |
| 75.0% | Quartile | 15 | 75.0% | Quartile | 2 |
| 50.0% | Median | 13 | 50.0% | Median | 2 |
| 25.0% | Quartile | 12 | 25.0% | Quartile | 1 |
| 10.0% | | 11 | 10.0% | | 1 |
| 2.5% | | 9 | 2.5% | | 0 |
| 0.5% | | 8 | 0.5% | | 0 |
| 0.0% | Minimum | 7 | 0.0% | Minimum | 0 |

| Summary Statistics | | Summary Statistics | |
|---|---|---|---|
| Mean | 13.281 | Mean | 2.1 |
| Std Dev | 1.903 | Std Dev | 1.500 |
| Std Err Mean | 0.0602 | Std Err Mean | 0.0474 |
| Upper 95% Mean | 13.399 | Upper 95% Mean | 2.193 |
| Lower 95% Mean | 13.163 | Lower 95% Mean | 2.007 |
| N | 1000 | N | 1000 |

Table 3 shows results comparing the use of the conventional method to the methods and techniques provided by embodiments of the present disclosure. For the data that is illustrated in Table 3, the lens began at the same lens position (i.e., at step 0) prior to the application of each method. The conventional method is shown to take nine steps to reach a similar lens position to that which embodiments of the present disclosure are able to reach in just four steps. As illustrated by steps 10-13 using the conventional method, even beyond the ninth step, the conventional method performs additional steps to adjust the lens position, but ultimately arrives at a lens position similar to the lens position already achieved in the ninth step. Thus, the difference in efficiency between the conventional methods and various embodiments of the present disclosure is significant.

TABLE 3

| Step | Conventional Position (degrees) | Conventional Focus Score | Auto Focus Position (degrees) | Auto Focus Score |
|---|---|---|---|---|
| 0 | 0 | −56.484 | 0 | −56.484 |
| 1 | 40 | −57.473 | 40 | −57.473 |
| 2 | 80 | −50.217 | 80 | 50.217 |
| 3 | 120 | 11.995 | 120 | 11.995 |
| 4 | 124.062 | 17.483 | 134.3279 | 21.39427 |
| 5 | 126.028 | 19.32 | | |
| 6 | 127.973 | 20.584 | | |
| 7 | 129.903 | 21.283 | | |
| 8 | 131.825 | 21.485 | | |
| 9 | 133.744 | 21.568 | | |
| 10 | 135.663 | 20.997 | | |
| 11 | 137.588 | 19.894 | | |
| 12 | 139.526 | 18.479 | | |
| 13 | 133.744 | 21.164 | | |

Figure 6:
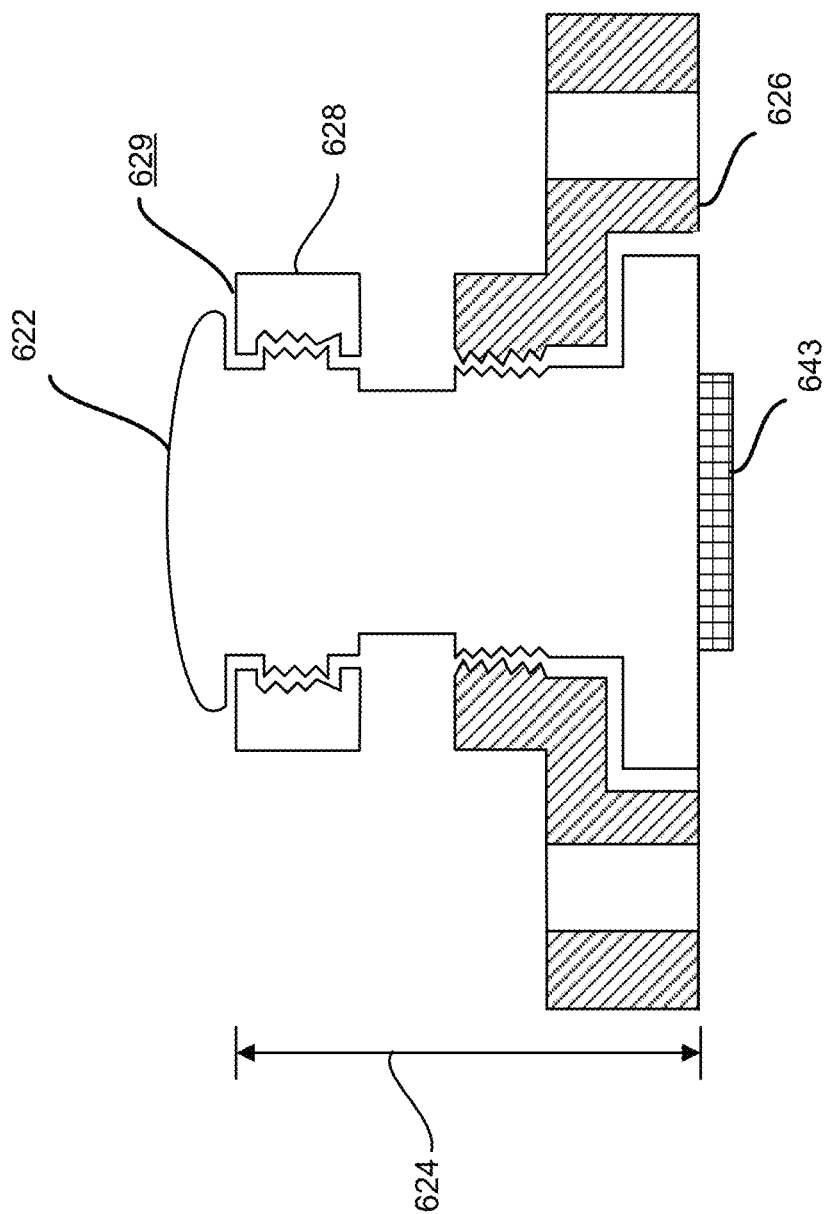
FIG. 6 illustrates an example of a lens housing and characteristics of a lens positioned in a housing according to an embodiment of the present disclosure.

FIG. 6 illustrates an example of a lens housing and characteristics of a lens positioned in a housing according to an embodiment of the present disclosure. As illustrated in FIG. 6, an exemplary assembly height 624 of a lens 622 mounted in a housing 626 is shown according to an embodiment of the present disclosure. The assembly height 624 corresponds to an initial position of the lens 622 with respect to the housing 626. The assembly height 624, which may be set during manufacturing, is defined in this example as equal to the distance between the base of housing 626 in which lens 622 is mounted and the surface 629 of the lens barrel 628 facing away from the base of housing 626 when the lens is focused for an object located at a predetermined location, for example, at a distance approximating infinity. The assembly height 624 is typically set during manufacturing based on the depth by which the base of lens 622 is inserted into housing 626, which results from the number of turns utilized when inserting lens 622 into the threads of housing 626. The inventors have determined that receiving a lens with a predetermined assembly height can reduce the number of steps utilized to move from the lens from an initial lens position to a focused lens position. The inventors have determined that this reduction in the number of steps results from the fact that a predetermined assembly height can result in the initial lens position being associated with a middle range of the curve that is fit to the through focus data, and not an upper or lower end of the curve that is fit to the through focus data. As a result, the spatial frequency response score and initial lens position can be accurately determined, and thus an accurate distance to the focused lens position can be determined during the first step.

In order to determine the value that should be associated with the assembly height 624 for the lens 622, assembly heights of multiple lenses positioned within multiple housings can be determined. Each of the multiple lenses can be disposed at a focused lens position, for example, for an object placed a predetermined distance from the lens. As an example, an object could be placed at a distance of 50 focal lengths from lens 622 in order to simulate an object at an infinite distance. At this object distance, the image distance will be 1.02 times the focal length of the lens, resulting in the lens 622 being positioned at a distance of approximately the focal length of the lens from the image sensor 643 of the camera. Using multiple lenses in this focused position, the average height of the measured assembly heights can then be determined. Given the average height, the assembly height for the lens 622 can be defined as equal to the average height. An offset may be added to or subtracted from the average height, and the assembly height for the lens 622 can be defined as equal to the average height plus the offset or minus the offset. During use, the lens 622 can be set to the assembly height 624 prior to initial image capture. Thus, referring to FIG. 3A, if the assembly height is determined to be associated with a lens position of 5 degrees, then the offset could be associated with a change in lens position of 25 degrees, resulting in the lens, after offset adjustment, being positioned at −20 degrees, which yields a spatial frequency response greater than the threshold score, enabling one step focusing.

Alternatively, the assembly height 624 may be determined to be the average height adjusted by a height associated with moving the lens 622 by a predefined number of degrees. For example, if the average height is determined to be 12.51 mm, and each degree of rotation is associated with a height change of 0.0014 mm, 30 degrees of movement of the lens 622 corresponds to shifting the lens position by a distance of 0.042 mm and 60 degrees of movement of the lens 622 corresponds to shifting the lens position by a distance of 0.083 mm. Therefore, if the assembly height 624 is defined as the average height based on measurements plus the height associated with 30 degrees of movement, the assembly height 624 can be determined to be 12.55 mm. Alternatively, if the assembly height 624 is defined as the average height based on measurements plus the height associated with 60 degrees of movement, the assembly height 624 can be determined to be 12.59 mm.

Table 4 shows results of focusing five lenses that were set to the assembly height of 12.55 mm using the conventional method and methods provided by embodiments of the present disclosure. For each lens, the conventional method involved nine steps to reach a focused lens position and the methods provided by embodiments of the present disclosure involved one step to reach the focused lens position. The angle difference between the lens position at the focused position using the conventional method and the lens position at the focused position using methods provided by embodiments of the present disclosure ranged from 1.24998 degrees to 8.33994 degrees. Additionally, the spatial frequency response score difference between the lens at the focused position using the conventional method and the lens at the focused position using methods provided by embodiments of the present disclosure ranged from 0.29853 to 3.63241. In most cases the methods provided by embodiments of the present disclosure performed similarly to or better than the conventional method.

TABLE 4

| Index | Conventional Steps | Auto Focus Steps | Angle Difference (degrees) | Score Difference (AU) |
|---|---|---|---|---|
| 1 | 9 | 1 | 1.24998 | 0.31264 |
| 2 | 9 | 1 | 1.44859 | 0.71090 |
| 3 | 9 | 1 | 1.78890 | 0.29853 |

TABLE 4-continued

| Index | Conventional Steps | Auto Focus Steps | Angle Difference (degrees) | Score Difference (AU) |
|---|---|---|---|---|
| 4 | 9 | 1 | 4.78125 | 0.45696 |
| 5 | 9 | 1 | 8.33994 | 3.63241 |

Table 5 shows results of focusing five lenses that were set to the assembly height of 12.59 mm using the conventional method and the methods provided by embodiments of the present disclosure. Use of the conventional method involved between nine and eleven steps for each lens to reach a focused lens position. Use of the methods provided by embodiments of the present disclosure involved between one and two steps to reach the focused lens position. The angle difference between the lens position at the focused position using the conventional method and the lens position at the focused position using the methods provided by embodiments of the present disclosure ranged from 0.5477 degrees to 5.231156 degrees. Additionally, the spatial frequency response score difference between the lens at the focused position achieved using the conventional method and the lens at the focused position achieved using the methods provided by embodiments of the present disclosure ranged from 0.178232 to 1.408934. In most cases the methods provided by embodiments of the present disclosure performed similarly to or better than the conventional method.

TABLE 5

| Index | Conventional Steps | Auto Focus Steps | Angle Difference (degrees) | Score Difference (AU) |
|---|---|---|---|---|
| 1 | 11 | 2 | 1.200523 | 0.200526 |
| 2 | 10 | 1 | 2.880271 | 1.408934 |
| 3 | 9 | 1 | 0.779675 | 0.178232 |
| 4 | 11 | 1 | 0.5477 | 0.411004 |
| 5 | 10 | 1 | 5.231156 | 1.403908 |

Figure 7:
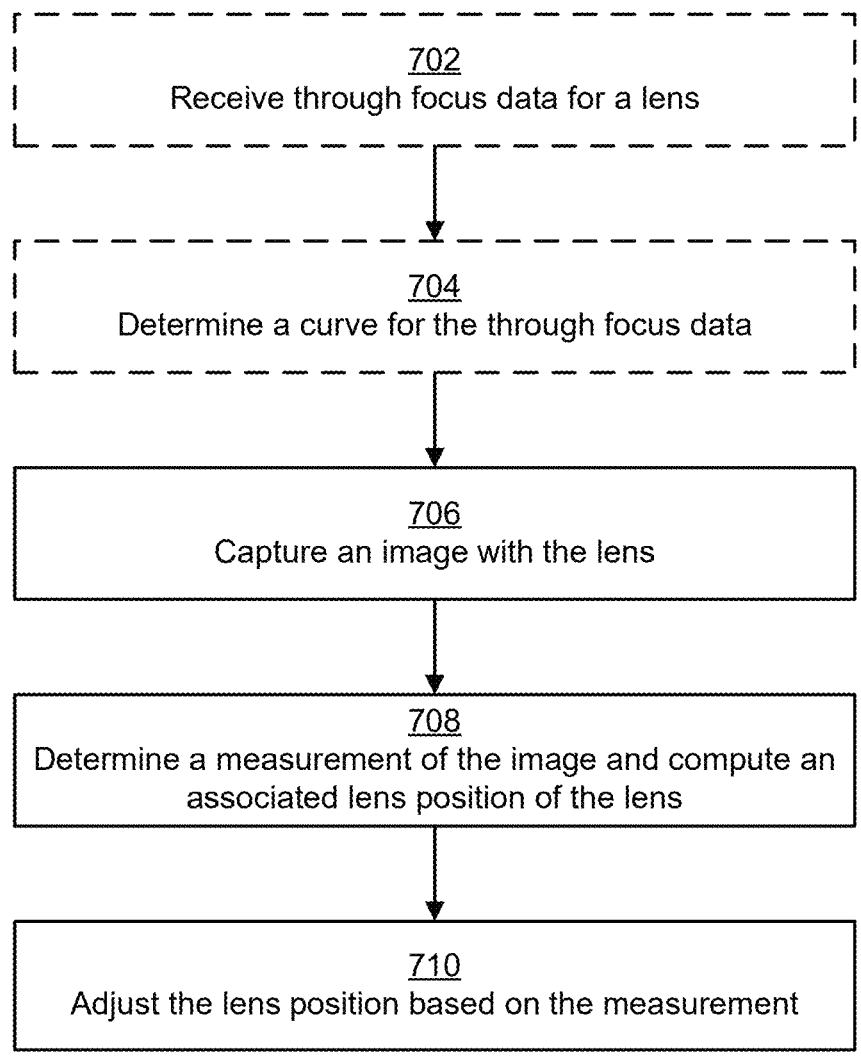
FIG. 7 illustrates an example flow of a process for auto focusing a lens according to an embodiment of the present disclosure.

FIG. 7 illustrates an example flow of a process for auto focusing a lens according to an embodiment of the present disclosure. The flow begins at operation 702, where through focus data for a lens is received. The through focus data will be represented by a curve similar to the through focus curve illustrated in FIG. 3A. The through focus data is generated by moving the lens to each lens position, capturing an image, and determining a measurement of each image. The measurement may be a spatial frequency response score or a variance of a Laplacian image generated from the image.

The flow continues with operation 704, where a polynomial model associated with a predetermined error, e.g., a minimum or smallest error, for the through focus data is determined. In some embodiments, the curve may be a polynomial model, a Gaussian model, or other suitable model. In an exemplary process, the through focus data is compared to a first polynomial model expressed as $y = p0 + p1x$, where x represents the lens position (i.e., represented by the lens angle), p0 and p1 are coefficients, and y represents the spatial frequency response score. A root mean square error is then calculated using the first polynomial model and the through focus data. A higher root mean square error indicates a larger difference between the polynomial model and the through focus data. If the root mean square error for the first polynomial model is too high, for example, higher than a predetermined threshold, a second polynomial model expressed as $y = p0 + p1x + p2x^2$ can be compared to the through focus data. A root mean square error for the second polynomial model and the through focus data is calculated. This process is repeated using progressively higher polynomial degrees until the root mean square error for the associated polynomial model has been reduced to a small enough value (e.g., below the predetermined threshold).

Alternatively, there may be a maximum degree polynomial model that is to be considered. For example, a ninth-degree polynomial model, corresponding to an equation expressed as $y=p0+p1x+p2x^2+p3x^3+p4x^4+p5x^5+p6x^6+p7x^7+p8x^8+p9x^9$, may be the highest degree polynomial model that is to be compared to the through focus data. Thus, the root mean square error may be determined for the highest degree polynomial model, and for each of the lower degree polynomial models. The polynomial model associated with the smallest root mean square error can then be determined to be the polynomial model that is to be associated with the through focus data.

Alternatively, although some of the higher degree polynomial models may be associated with smaller root mean square errors, for purposes of computational efficiency and reduction in system complexity, a polynomial model having less than the highest degree can be utilized. As an example, it may be determined that a sixth-degree polynomial model may be characterized by a root mean square error that is lower than the predetermined threshold. Thus, although the seventh-degree polynomial model may produce a lower root mean square error than the sixth-degree polynomial model, the sixth-degree polynomial model will be utilized because it provides a root mean square error less than the predetermined threshold at a computational efficiency level lower than the computational efficiency associated with the seventh-degree polynomial model. One of ordinary skill in the art would recognize many variations, modifications, and alternatives.

The flow continues with operation 706, where an image is captured using the lens. The lens is positioned at a first lens position, which corresponds to a first lens angle.

The flow continues with operation 708, where a measurement of the image is determined and an associated lens position of the lens is computed. In some examples, the measurement can be a spatial frequency response score of the image. To determine the spatial frequency response score, the curve that was determined to have the smallest root mean square error of the various polynomial models can be solved to determine the spatial frequency response score. That is, $y=SFR_{score}$ and $y-SFR_{score}=0$. By solving this equation, the lens position of any spatial frequency response score can be calculated. Newton's method is an example of a technique that may be used to solve the equation $y-SFR_{score}=0$. Newton's method involves generating a tangent line that is a linear approximation to the through focus data near a first point on the x-axis, i.e., the axis associated with the lens position. A second tangent line is then generated that is a linear approximation of the through focus data near a second point on the x-axis. The second point on the x-axis corresponds to the point where the first tangent line intersects the x-axis. This process is repeated until the root is found to the desired accuracy. The solved equation indicates the spatial frequency response score of the image. Based on the through focus data, the lens position can be determined from the spatial frequency response score. In other examples, the measurement can be a variance of a Laplacian image that is generated from the image, which is described further in FIGS. 8-10.

The flow continues with operation 710, where the lens position is adjusted based on the measurement. If the measurement is lower than the threshold, the lens position may be adjusted a predefined amount. The predefined amount can be based on the through focus curve for the particular lens. The predefined amount may be an amount determined to adjust the lens position such that a subsequent image captured at the adjusted lens position will have an associated measurement that is greater than the threshold. As an example, the predefined amount for the lens may be 40 degrees. If the measurement meets or exceeds the threshold, a distance from the current lens position to a peak lens position, i.e., the lens position represented by the lens angle corresponding to the peak of the polynomial model, can be calculated based on the polynomial model and the current lens position. The lens can then be adjusted using the distance so that the adjusted lens position (i.e., the lens angle) corresponds to the peak lens position, thereby being associated with the maximum spatial frequency response score. Thus, at the peak lens position, the lens can be considered to be optimally focused. The motor associated with the lens can move the lens the to the focused lens position.

In some examples, such as during a quality analysis of the auto focus system, an additional image can be captured with the lens subsequent to the lens being adjusted to the determined focused lens position. A measurement of the additional image, for example, a spatial frequency response score, can then be determined. The measurement can be compared to a specification value of a known maximum measurement. If the measurement is below the specification value, the lens may be determined to be an inadequate product. As a result, the lens can be rejected for subsequent image capture, remanufactured and retested using embodiments of the present disclosure, or the like.

It should be appreciated that the specific steps illustrated in FIG. 7 provide a particular method of auto focusing a lens according to an embodiment of the present disclosure. Other sequences of steps may also be performed according to alternative embodiments. For example, alternative embodiments of the present disclosure may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
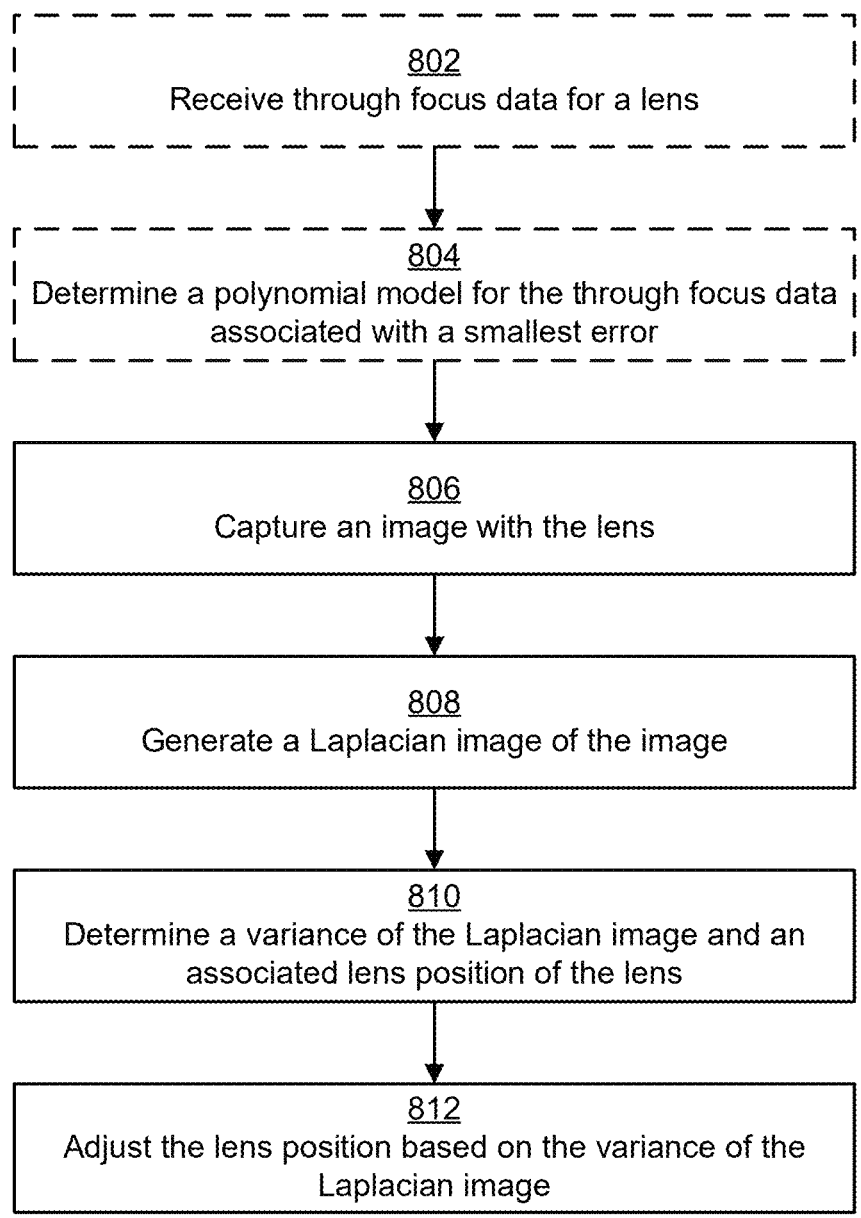
FIG. 8 illustrates an example flow of a process for auto focusing a lens based on a variance of a Laplacian image according to an embodiment of the present disclosure.

FIG. 8 illustrates an example flow of a process for auto focusing a lens based on a variance of a Laplacian image according to an embodiment of the present disclosure. A Laplacian variance-based approached can be used to provide increased reliability in the focus measurement. Although the variance of the Laplacian image is utilized in exemplary embodiments, other statistical measures of the Laplacian image can be used including the standard deviation in place of the variance. The flow begins at operation 802, where through focus data for a lens is received. The through focus data can be represented by a curve similar to the through focus curve illustrated in FIG. 3A. The through focus data is generated by moving the lens to each lens position, capturing an image, generating a Laplacian image, and determining a variance of each Laplacian image. The through focus data can be stored in a memory of the camera and retrieved for use during operation of the camera or otherwise determined. One of ordinary skill in the art would recognize many variations, modifications, and alternatives.

The flow continues with operation 804, where a polynomial model associated with a predetermined error, e.g., a minimum or smallest error, for the through focus data is determined. In an exemplary process, the through focus data is compared to a first polynomial model expressed as y=p0+p1x, where x represents the lens position (i.e., represented by the lens angle), p0 and p1 are coefficients, and y represents the variance of the Laplacian image. A root mean square error is then calculated using the first polynomial model and the through focus data. A higher root mean square error indicates a larger difference between the polynomial model and the through focus data. If the root mean square error for the first polynomial model is too high, for example, higher than a predetermined threshold, a second polynomial model expressed as y=p0+p1x+p2x² can be compared to the through focus data. A root mean square error for the second polynomial model and the through focus data is calculated. This process is repeated using progressively higher polynomial degrees until the root mean square error for the associated polynomial model has been reduced to a small enough value (e.g., below the predetermined threshold).

Alternatively, there may be a maximum degree polynomial model that is to be considered. For example, a ninth-degree polynomial model, corresponding to an equation expressed as y=p0+p1x+p2x²+p3x³+p4x⁴+p5x⁵+p6x⁶+p7x⁷+p8x⁸+p9x⁹, may be the highest degree polynomial model that is to be compared to the through focus data. Thus, the root mean square error may be determined for the highest degree polynomial model, and for each of the lower degree polynomial models. The polynomial model associated with the smallest root mean square error can then be determined to be the polynomial model that is to be associated with the through focus data.

Alternatively, although some of the higher degree polynomial models may be associated with smaller root mean square errors, for purposes of computational efficiency and reduction in system complexity, a polynomial model having less than the highest degree can be utilized. As an example, it may be determined that a sixth-degree polynomial model may be characterized by a root mean square error that is lower than the predetermined threshold. Thus, although the seventh-degree polynomial model may produce a lower root mean square error than the sixth-degree polynomial model, the sixth-degree polynomial model will be utilized because it provides a root mean square error less than the predetermined threshold at a computational efficiency level lower than the computational efficiency associated with the seventh-degree polynomial model. One of ordinary skill in the art would recognize many variations, modifications, and alternatives.

Similar to the through focus data, the polynomial model that is fit to the through focus data can be stored in a memory of the camera and retrieved for use during operation of the camera. Thus, the receiving of the through focus data and the determination of the polynomial model associated with a predetermined error for the through focus data can be performed once for the lens and then utilized during operation of the camera over the life of the camera. It should also be noted that the through focus data and the polynomial model that is fit to the through focus data to provide the through focus curve may be based on mathematical models of the lens and not on measurements made using a physical lens. Thus, both through focus curves based on physical lenses and well through focus curves based on mathematical models of lenses are included within the scope of the present disclosure.

The flow continues with operation 806, where an image is captured using the lens. The lens is positioned at a first lens position, which corresponds to a first lens angle.

The flow continues with operation 808, where a Laplacian image of the image is generated. Generating the Laplacian image involves applying a Laplacian operator to the image. Laplacian-based operators have improved overall performance under normal imaging conditions. The Laplacian image is a discrete approximation of the second derivative of the image and highlights regions with rapid changes in intensities. Thus, the Laplacian image is highly suitable for detecting changes in focus.

The flow continues with operation 810, where a variance of the Laplacian image is determined and an associated lens position of the lens is computed. The variance of the Laplacian image is calculated with the equation:

$$\phi_{ij} = \sum_{(ij)=\Omega(x,y)} (\Delta I(ij) - \overline{\Delta I})^2$$

where $\overline{\Delta I}$ is the mean value of the Laplacian image within $\Omega(x, y)$. The variance of the Laplacian can be associated with the focus score, similar to the spatial frequency response score. The variance of the Laplacian may result in a better curve fit to the selected model than that provided by the spatial frequency response score. As a result, fewer steps may be involved in reaching a focused lens position when using the variance of the Laplacian as illustrated in FIG. 8.

The flow continues with operation 812, where the lens position is adjusted based on the variance of the Laplacian image. If the variance of the Laplacian image is lower than a threshold, the lens position may be adjusted a predefined amount. The predefined amount can be based on the through focus curve for the particular lens. The predefined amount may be an amount determined to adjust the lens position such that a subsequent image captured at the adjusted lens position will have an associated variance of the Laplacian image that is greater than the threshold. As an example, the predefined amount for the lens may be 40 degrees. If the measurement meets or exceeds the threshold, a distance from the current lens position to a peak lens angle can be calculated based on the through focus data and the curve. The lens can then be adjusted the distance so that the adjusted angle corresponds to the peak lens angle, which is associated with the maximum variance of the Laplacian image and a focused lens position. As discussed, above, although the variance of the Laplacian image is utilized in exemplary embodiments, other statistical measures of the Laplacian image can be used including the standard deviation in place of the variance.

It should be appreciated that the specific steps illustrated in FIG. 8 provide a particular method of focusing a lens based on a variance of a Laplacian image according to an embodiment of the present disclosure. Other sequences of steps may also be performed according to alternative embodiments. For example, alternative embodiments of the present disclosure may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
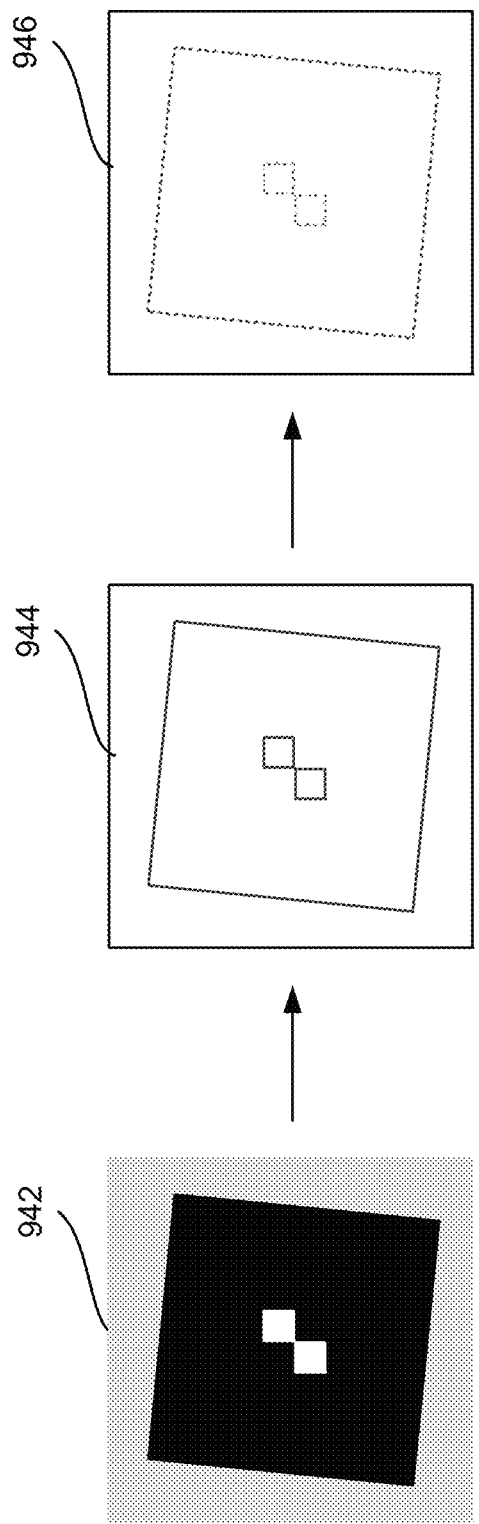
FIG. 9 illustrates an example of a Laplacian image according to an embodiment of the present disclosure.

FIG. 9 illustrates an example of a Laplacian image according to an embodiment of the present disclosure. An input image 942 is an image captured by a lens at a first lens position. A Laplacian image 944 is generated for the input image 942. Generating the Laplacian image 944 involves applying a Laplacian operator to the input image 942. Laplacian-based operators have improved overall performance under normal imaging conditions. The Laplacian image 944 is a discrete approximation of the second derivative of the image and highlights regions with rapid changes in intensities. Thus, the Laplacian image is highly suitable for detecting changes in focus. A variance 946 of the Laplacian image 944 is determined. The variance 946 can then be used as the measurement associated with the through focus data and lens position calculations.

Figure 10:
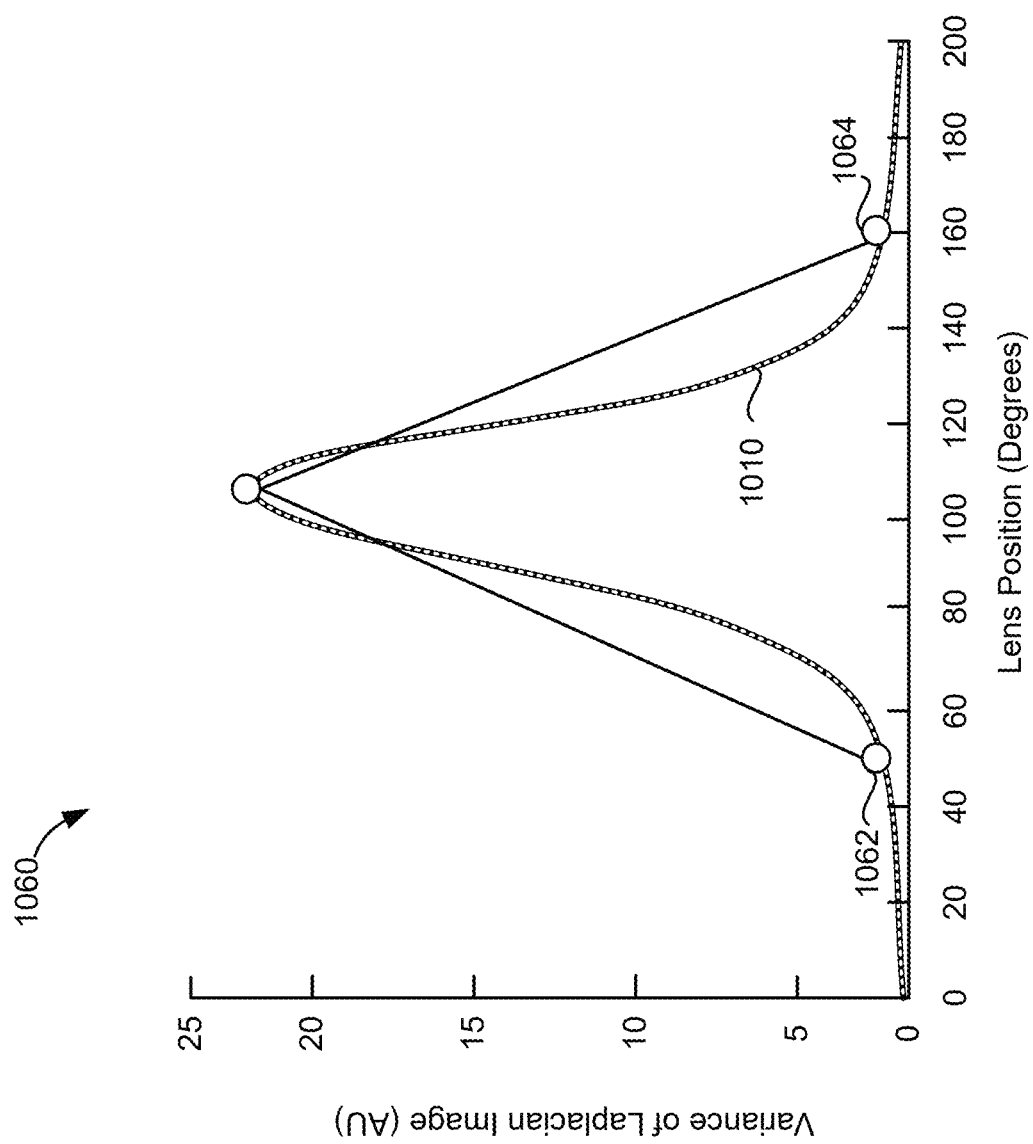
FIG. 10 illustrates an example of auto focusing a lens based on a variance of a Laplacian image according to an embodiment of the present disclosure.

FIG. 10 illustrates an example of auto focusing a lens based on a variance of a Laplacian image according to an embodiment of the present disclosure. Graph 1060 is a plot showing the variance of a Laplacian image as a function of lens position (measured in lens angle) and a polynomial model 1010 fit to the through focus data. As illustrated in graph 1060, the focused lens position is at 5 degrees. For a given variance of the Laplacian image, the current lens position may be less than the focused lens position, as illustrated by variance of the Laplacian image 1062. Alternatively, the current lens position may be greater than the focused lens position, as illustrated by variance of the Laplacian image 1064 in graph 1060. Embodiments of the present disclosure can measure the variance of the Laplacian image and move the lens to an increased lens position as illustrated by the motion from 50 degrees to 105 degrees. If, based on the variance of the Laplacian image of FM=1.0238, it was determined by solving the polynomial model that the lens was positioned at a lens positon of 160 degrees, then motion of the lens position by 55 degrees would result in the current variance of the Laplacian image decreasing, not increasing. This would be an indication that the lens position needed to be decreased by 55 degrees to arrive at adjusted lens position of 105 degrees. Similarly, motion of the lens position by −55 degrees, starting from the current lens position of 45 degrees, would result in the current variance of the Laplacian image decreasing, not increasing. This would be an indication that the lens position needed to be increased by 55 degrees to arrive at adjusted lens position of 105 degrees. Thus, if an initial motion results in a decrease in the variance of the Laplacian image, the subsequent motion can be equal to twice the initial motion and in the opposite direction in order to arrive at the lens position associated with optimal focus.

Table 6 shows results of focusing five lenses that were set to the assembly height of 12.55 mm using the conventional method and the auto focus method of the present disclosure with a variance of the Laplacian image. For each lens, the conventional method involved nine steps to reach a focused lens position and the auto focus method involved one step to reach the focused lens position. The angle difference between the lens at the focused position using the conventional method and the lens at the focused position using the auto focus method ranged from 0.404416 degrees to 9.37275 degrees. Additionally, the variance of the Laplacian image difference between the lens at the focused position using the conventional method and the lens at the focused position using the auto focus method ranged from 0.00378 to 4.279243. In most cases the auto focus method performed similarly to or better than the conventional method.

TABLE 6

| Index | Conventional Steps | Auto Focus Steps | Angle Difference | Variance of the Laplacian Image Difference |
|---|---|---|---|---|
| 1 | 9 | 1 | 0.404416 | 0.029446 |
| 2 | 9 | 1 | 0.733906 | 0.533829 |
| 3 | 9 | 1 | 0.820581 | 0.00378 |
| 4 | 9 | 1 | 2.420523 | 0.881108 |
| 5 | 9 | 1 | 9.37275 | 4.279243 |

Table 7 shows results of focusing five lenses that were set to the assembly height of 12.59 mm using the conventional method and the focus method of the present disclosure with a variance of the Laplacian image. The conventional method involved between nine and eleven steps to reach a focused lens position for each lens. The auto focus method involved one step to reach the focused lens position for each lens. The angle difference between the lens at the focused position using the conventional method and the lens at the focused position using the auto focus method ranged from 0.561052 degrees to 6.628474 degrees. Additionally, the variance of the Laplacian image difference between the lens at the focused position using the conventional method and the lens at the focused position using the auto focus method ranged from 0.312104 to 2.395142. In most cases the auto focus method performed similarly to or better than the conventional method.

TABLE 7

| Index | Conventional Steps | Auto Focus Steps | Angle Difference | Score Difference |
|---|---|---|---|---|
| 1 | 11 | 1 | 0.561052 | 0.312104 |
| 2 | 10 | 1 | 3.428942 | 1.796517 |
| 3 | 9 | 1 | 2.607537 | 1.6267 |
| 4 | 11 | 1 | 2.292151 | 0.8732 |
| 5 | 10 | 1 | 6.628474 | 2.395142 |

Figure 11:
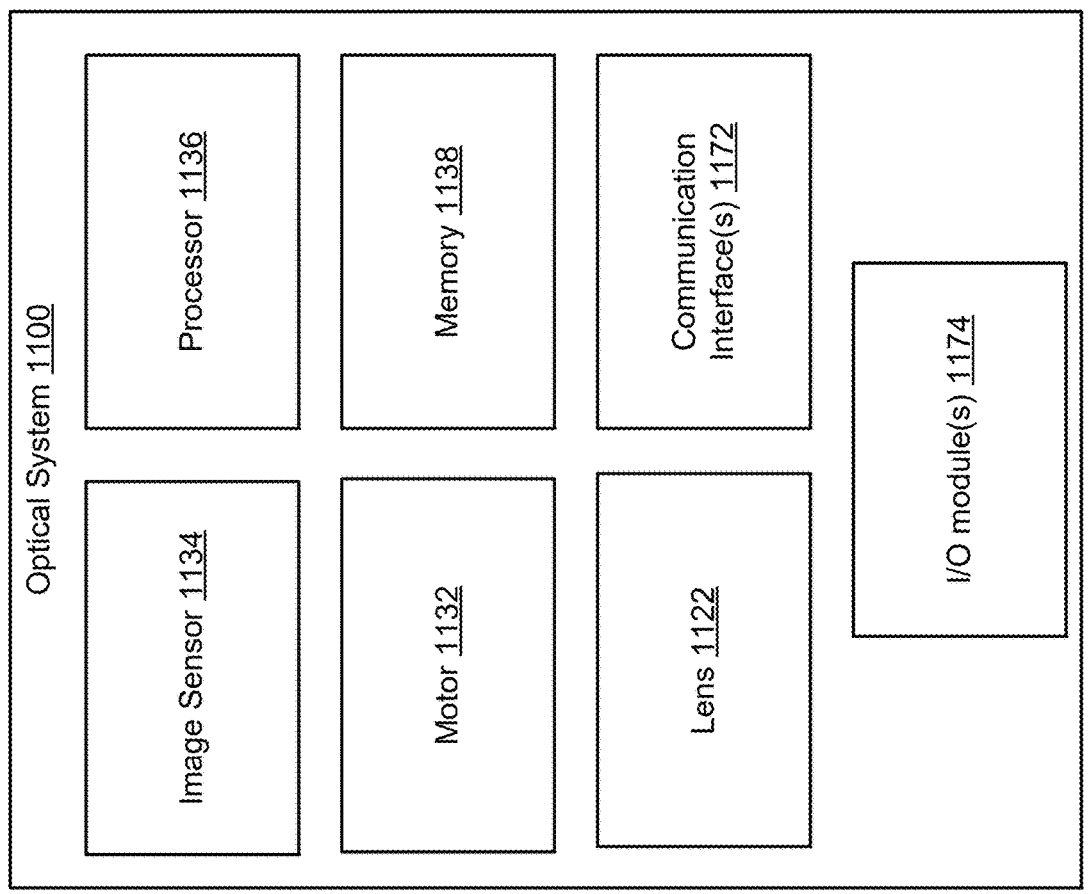
FIG. 11 illustrates a block diagram of an example of an optical system for auto focusing a lens according to an embodiment of the present disclosure.

FIG. 11 illustrates a block diagram of an example of an optical system for auto focusing a lens according to an embodiment of the present disclosure. The optical system 1100 can be a camera or other imaging device with at least one lens 1122. The optical system 1100 also includes an image sensor 1134. During operation, light illuminates objects in the field of view of the optical system 1100 and these objects are imaged using the image sensor 1134. Additionally, the optical system 1100 includes motor 1132 for positioning the lens 1122 with respect to the image sensor 1134. The motor 1132 may be rotatable in multiple directions, such as clockwise and counterclockwise, to translate the lens 1122 from a first lens position to a second lens position. The translation can be based on a determination of a distance to translate for the lens 1122 to be at a focused position.

The optical system 1100 may be in communication with a service provider via one or more networks. The service provider may include one or more service provider computers, perhaps arranged in a cluster of servers or as a server farm, and may host web service applications. The function of the service provider may be implemented a cloud-based environment such that individual components of the service provider are virtual resources in a distributed environment. The optical system 1100 may also contain communication interface(s) 1172 that allow the optical system 1100 to communicate with a data store, another computing device or server, user terminals, and/or other devices on the networks.

The optical system 1100 may also include I/O module(s) 1174, such as a voice input module, a touch input module, a display, speakers, etc. for receiving or outputting information related to auto focusing the lens 1122.

The optical system 1100 (or the service provider) may include at least one memory 1138 and one or more processing units (or processor(s)) 1136. The processor 1136 may be implemented as appropriate in hardware, computer-executable instructions, software, firmware, or combinations thereof. Computer-executable instruction, software, or firmware implementations of the processor 1136 may include computer-executable or machine-executable instructions written in any suitable programming language to perform the various functions described. The memory 1138 may store program instructions that are loadable and executable on the processor(s) 1136, as well as data generated during the execution of these programs. Depending on the configuration and type of memory, the memory 1138 may be volatile (such as RAM and/or non-volatile (such as read-only memory ("ROM"), flash memory, or other memory)). The memory 1138 may include an operating system and one or more application programs, modules, or services for implementing the features disclosed herein including at least lens adjustment.

The optical system 1100 or the service provider may also include additional storage, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage, both removable and non-removable, is examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components, may refer to programming modules executed by computing systems (e.g., processors) that are part of the optical system 1100, the service provider, or any associated user device in communication over the network.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method implemented on a device, the method comprising:
   receiving, by a processor of the device upon execution by the processor of instructions stored in a memory of the device, a curve that is fit to through focus data for a lens of the device, the curve predetermined prior to a capture of an image;
   capturing the image with the lens, wherein the lens is at a first lens position;
   determining, by the processor upon the execution of the instructions, a measurement by using the image;
   determining, by the processor upon the execution of the instructions and by at least comparing the measurement with the curve, the first lens position;
   determining, by the processor upon the execution of the instructions, a distance based on the first lens position and the curve; and
   causing, by the processor upon the execution of the instructions, the lens to be placed in a second lens position that corresponds to repositioning the lens from the first lens position according to the distance.

2. The method of claim 1, wherein the curve comprises a polynomial model or a Gaussian model.

3. The method of claim 1, wherein the measurement comprises a spatial frequency response score.

4. The method of claim 1, further comprising:
generating, by the processor upon the execution of the instructions, a Laplacian image of the image; and
determining, by the processor upon the execution of the instructions, a variance of the Laplacian image, wherein the measurement associated with the image comprises the variance of the Laplacian image.

5. The method of claim 1, further comprising:
measuring, by the processor upon the execution of the instructions, a second distance between a base of a housing in which the lens is mounted and a surface of a lens barrel facing away from the base of the housing, wherein the lens is disposed at a focused lens position;
determining, by the processor upon the execution of the instructions and from the second distance, an average height; and
setting, by the processor upon the execution of the instructions, a lens surface at the average height less an offset prior to capturing the image.

6. The method of claim 1, wherein determining the curve fit to the through focus data for the lens comprises:
receiving, by the processor upon the execution of the instructions, the through focus data for the lens;
determining, by the processor upon the execution of the instructions, a first error associated with fitting a first curve to the through focus data;
determining, by the processor upon the execution of the instructions, a second error associated with fitting a second curve to the through focus data;
determining, by the processor upon the execution of the instructions, that the second error is smaller than the first error; and
defining, by the processor upon the execution of the instructions, the second curve as the curve fit to the through focus data for the lens.

7. The method of claim 1, further comprising, prior to capturing the image with the lens:
capturing an initial image with the lens;
determining, by the processor upon the execution of the instructions, an initial measurement associated with the initial image;
determining, by the processor upon the execution of the instructions, that the initial measurement is lower than a threshold score; and
in response to determining that the initial measurement is lower than the threshold score, causing, by the processor upon the execution of the instructions, the lens to be moved by a predetermined amount to the first lens position.

8. The method of claim 1, wherein the image is a first image, the measurement is a first measurement, and the method further comprising:
capturing, subsequent to placing the lens in the second lens position based on the first lens position and the curve, a second image with the lens at the second lens position;
determining, by the processor upon the execution of the instructions, a second measurement associated with the second image;

determining, by the processor upon the execution of the instructions, that the second measurement is below a specification value; and
outputting, by the processor upon the execution of the instructions, data indicating that the lens is defective.

9. One or more non-transitory computer-readable storage media storing instructions, that upon execution by a processor of a device, cause operations comprising:
determining a curve that is fit to through focus data for a lens, the curve predetermined prior to a capture of an image;
capturing the image with the lens, wherein the lens is at a first lens position;
determining a measurement by using the image;
determining, by comparing the measurement with the curve, the first lens position;
determining a distance based on the first lens position and the curve; and
placing the lens in a second lens position that corresponds to repositioning the lens from the first lens position according to the distance.

10. The one or more non-transitory computer-readable storage media of claim 9, wherein the operations further comprise:
capturing, with the lens at the second lens position, a second image;
determining a second measurement associated with the second image;
determining that the second measurement is lower than a specification value; and
outputting data indicating that the lens is defective.

11. The one or more non-transitory computer-readable storage media of claim 9, wherein the operations further comprise:
prior to capturing the image with the lens positioned at the first lens position, setting a surface of the lens to a predetermined height with respect to a housing.

12. The one or more non-transitory computer-readable storage media of claim 11, wherein the operations further comprise determining the predetermined height by:
measuring, for each of a plurality of lenses, a corresponding distance between a base of a housing in which a lens of the plurality of lenses is mounted and a surface of a lens barrel facing away from the base of the housing, wherein the lens is disposed at a focused lens position;
determining, from a measured distance, an average height; and
setting the predetermined height to the average height less an offset.

13. A device comprising:
a lens;
memory storing instructions; and
a processor configured to execute instructions, wherein execution of the instructions by the processor configures the device to:
determine a curve that is fit to through focus data for a lens, the curve predetermined prior to a capture of an image;
capture the image with the lens, wherein the lens is at a first lens position;
determine a measurement by using the image;
determine, by comparing the measurement with the curve, the first lens position;
determine a distance based on the first lens position and the curve; and place the lens in a second lens position that corresponds to repositioning the lens from the first lens position according to the distance.

14. The device of claim 13, wherein the execution of the instructions by the processor further configures the device to:
capture a second image with the lens positioned at the second lens position;
determine a second measurement for the second image;
determine that the second measurement is lower than a specification value; and
output data indicating that the lens is defective.

15. The device of claim 13, wherein the execution of the instructions by the processor further configures the device to:
prior to capturing the image with the lens positioned at the first lens position, setting a surface of the lens to a predetermined height with respect to a housing.

16. The device of claim 13, wherein the curve is a model that comprises a polynomial model or a Gaussian model.

17. The device of claim 13, wherein the measurement comprises a spatial frequency response score or a variance of a Laplacian image.

18. The device of claim 13, wherein the execution of the instructions by the processor further configures the device to:
measure, for each of a plurality of lenses, a corresponding distance between a base of a housing in which a lens of the plurality of lenses is mounted and a surface of a lens barrel facing away from the base of the housing, wherein the lens is disposed at a focused lens position;
determine, from a measured distance, an average height; and
set, for each of the plurality of lenses, a lens surface at the average height less an offset prior to capturing the image.

19. The device of claim 13, wherein determining the curve comprises determining a model by at least:
determining a first error associated with fitting a first curve to the through focus data;
determining a second error associated with fitting a second curve to the through focus data;
determining that the second error is smaller than the first error; and
defining the second curve as the model for the through focus data associated with the lens.

20. The device of claim 13, wherein the execution of the instructions by the processor further configures the device to:
capture a second image with the lens positioned at the second lens position;
determine a second measurement for the second image;
determine that the second measurement is greater than a threshold value; and
adjust the lens from the second lens position to a third lens position based on the second measurement being greater than the threshold value.

* * * * *